United States Patent
Tsuda

(10) Patent No.: US 10,015,752 B2
(45) Date of Patent: Jul. 3, 2018

(54) COMMUNICATION CONTROL DEVICE, COMMUNICATION CONTROL METHOD, RADIO COMMUNICATION SYSTEM, AND TERMINAL DEVICE

(71) Applicant: SONY CORPORATION, Tokyo (JP)

(72) Inventor: Shinichiro Tsuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/899,023

(22) PCT Filed: May 1, 2014

(86) PCT No.: PCT/JP2014/062110
§ 371 (c)(1),
(2) Date: Dec. 16, 2015

(87) PCT Pub. No.: WO2015/001840
PCT Pub. Date: Jan. 8, 2015

(65) Prior Publication Data
US 2016/0128001 A1 May 5, 2016

(30) Foreign Application Priority Data
Jul. 2, 2013 (JP) .................... 2013-138689

(51) Int. Cl.
*H04W 52/24* (2009.01)
*H04W 16/32* (2009.01)
(Continued)

(52) U.S. Cl.
CPC ......... *H04W 52/243* (2013.01); *H04W 16/32* (2013.01); *H04W 24/10* (2013.01);
(Continued)

(58) Field of Classification Search
CPC .................................................. H04W 52/243
See application file for complete search history.

(56) References Cited

U.S. PATENT DOCUMENTS

2007/0082619 A1 4/2007 Zhang et al.
2009/0122739 A1 5/2009 Yonezawa
(Continued)

FOREIGN PATENT DOCUMENTS

EP 2675223 A1 12/2013
JP 2010-512680 A 4/2010
(Continued)

OTHER PUBLICATIONS

"Network Assisted Home eNodeB Transmission Power Control in Downlink" TSG-RAN Working Group 4 (Radio) Meeting #52bis, R4-093619, Oct. 12-16, 2009, Kyocera, 6 pages, Miyazaki, Japan.
(Continued)

*Primary Examiner* — John Blanton
(74) *Attorney, Agent, or Firm* — Chip Law Group

(57) ABSTRACT

A communication control device comprises: an obtaining unit configured to, in a radio communication system including a primary base station to which a primary terminal is connected, and a secondary base station to which a secondary terminal is connected by secondarily using a frequency channel for the primary base station, obtain at least one of a quality report containing a communication quality indicator measured by the primary terminal and a quality report containing a communication quality indicator measured by the secondary terminal; and an interference control unit configured to instruct the secondary base station to reduce transmission power, when it is determined that adverse interference is present in the radio communication system, based on the communication quality indicator contained in the quality report obtained by the obtaining unit.

4 Claims, 21 Drawing Sheets

(51) Int. Cl.
| | | |
|---|---|---|
| *H04W 24/10* | (2009.01) | |
| *H04W 36/04* | (2009.01) | |
| *H04W 36/20* | (2009.01) | |
| *H04W 52/14* | (2009.01) | |
| *H04W 72/04* | (2009.01) | |
| *H04W 72/08* | (2009.01) | |
| *H04L 5/00* | (2006.01) | |
| *H04L 25/02* | (2006.01) | |
| *H04W 52/34* | (2009.01) | |
| *H04W 52/36* | (2009.01) | |
| *H04B 17/318* | (2015.01) | |

(52) U.S. Cl.
CPC .......... *H04W 36/04* (2013.01); *H04W 36/20* (2013.01); *H04W 52/143* (2013.01); *H04W 52/24* (2013.01); *H04W 52/241* (2013.01); *H04W 52/244* (2013.01); *H04W 52/247* (2013.01); *H04W 72/0426* (2013.01); *H04W 72/0473* (2013.01); *H04W 72/082* (2013.01); *H04B 17/318* (2015.01); *H04L 5/001* (2013.01); *H04L 25/0226* (2013.01); *H04W 52/242* (2013.01); *H04W 52/245* (2013.01); *H04W 52/34* (2013.01); *H04W 52/367* (2013.01); *H04W 72/085* (2013.01)

(56) References Cited

U.S. PATENT DOCUMENTS

| | | | | |
|---|---|---|---|---|
| 2011/0243015 | A1* | 10/2011 | Lim | H04L 1/0026 370/252 |
| 2011/0263262 | A1* | 10/2011 | Min | H04W 36/0083 455/438 |
| 2012/0276937 | A1* | 11/2012 | Astely | H04W 72/082 455/501 |
| 2012/0302263 | A1* | 11/2012 | Tinnakornsrisuphap | H04W 64/00 455/456.6 |
| 2013/0005388 | A1 | 1/2013 | Naka et al. | |
| 2015/0036630 | A1* | 2/2015 | Chen | H04W 72/085 370/329 |
| 2015/0223113 | A1* | 8/2015 | Matsunaga | H04W 48/06 370/236 |
| 2015/0365844 | A1* | 12/2015 | Qin | H04W 16/02 370/280 |
| 2015/0373660 | A1* | 12/2015 | Gunnarsson | H04W 56/0045 370/350 |
| 2015/0381254 | A1* | 12/2015 | Liang | H04B 7/024 370/329 |
| 2016/0020893 | A1* | 1/2016 | Tong | H04W 72/0446 370/280 |
| 2016/0112178 | A1* | 4/2016 | Yi | H04W 16/32 370/280 |

FOREIGN PATENT DOCUMENTS

| | | |
|---|---|---|
| JP | 2010-178225 A | 8/2010 |
| JP | 2010-193433 A | 9/2010 |
| JP | 2011-146804 A | 7/2011 |
| JP | 2012-070274 A | 4/2012 |
| JP | 2013-541868 A | 11/2013 |
| JP | 2014-529205 A | 10/2014 |
| WO | 2012-024454 A1 | 2/2012 |
| WO | 2012/024454 A1 | 2/2012 |
| WO | 2012/136122 A1 | 10/2012 |
| WO | 2012/177207 A1 | 12/2012 |

OTHER PUBLICATIONS

Search Report and Written Opinion for SG Patent Application No. 11201510716Q, dated Sep. 16, 2016, 11 pages.

"Text Proposal for TR36.9xx: Smart Power Control", NEC, Kyocera, picoChip Designs, 3GPP TSG-RAN WG4 Meeting #53, Jeju, Korea, Nov. 9-13, 2009, pp. 01-10.

"Network Assisted Home eNodeB Transmission Power Control in Downlink", Kyocera, 7.6 FDD HeNB RF Requirements [HeNB-RF_FDD], TSG-RAN Working Group 4 (Radio) meeting #52bis, Miyazaki, Japan, Oct. 12-16, 2009, pp. 01-06.

"HeNB Interference management for LTE Rel-9 via power control", Nokia Siemens Networks, Nokia, 3GPP TSG RAN WG4 #52bis, Miyazaki, Japan, Oct. 12-16, 2009, 07 pages.

"Evolved Universal Terrestrial Radio Access (E-UTRA)", FDD Home eNode B (HeNB) Radio Frequency (RF) requirements analysis, 3GPP TR 36.921 version 9.0.0 Release 9, ETSI TR 136 921 V9.0.0, pp. 01-44.

Lima, et al., "Coordinated TDD-Underlay for Self-organizing Femtocells in Two-Tier Coexistence Scenarios", EURASIP Journal on Wireless Communications and Networking, vol. 1, Jan. 2013, pp. 01-11.

Zalonis, et al.,"Femtocell downlink power control based on Radio Environment Maps", IEEE Wireless Communications and Networking Conference (WCNC), Apr. 2012, pp. 1224-1228.

Extended European Search Report of EP Application No. 14820169.2, dated Dec. 12, 2016, 11 pages.

Mediatek Inc, "Further Discussion on HeNB Downlink Power Setting in HetNet", Draft; R1-106009, 3rd Generation Partnership project (3gpp), mobile competence centre; 650, Route Des lucioles; F-06921 Sophia-Antipolis Cedex, France, vol. RAN WG1, No. Jacksonville, USA, Nov. 9, 2010, 7 pages.

Qualcomm Europe, "Proposais for HeNB Downlink ICIC", Draft; R4-093726 Proposals for HeNB ICIC, 3rd Generation Partnership Project (3gpp), mobile competence centre; 650, route Des Lucioles; F-06921 Sophia-Antipolis Cedex; France, vol. Ran WG4, No. Miyazaki, Oct. 6, 2009, 2 pages.

Bai, et al., "Hybrid spectrum arrangement and interference mitigation for coexistence between LTE macrocellular and femtocell networks", EURASIP Journal on Wireless Communications and Networking, 2013, pp. 1-15.

Office Action for SG Patent Application No. 11201510716Q, dated Aug. 29, 2017, 7 pages of Office Action.

Office Action for EP Patent Application No. 14820169.2, dated Feb. 9, 2018, 07 pages.

"Network Assisted Home eNodeB Transmission Power Control in Downlink", Kyocera, TSG-RAN Working Group 4 (Radio) meeting #52bis, R4-093619, Oct. 12-16, 2009, 06 pages.

"Further Discussion on HeNB Downlink Power Setting in HetNet", MediaTek Inc., 3GPP TSG-RAN WG1 #63, R1-106009, Jacksonville, USA, Nov. 15-19, 2010, 07 pages.

"Proposals for HeNB Downlink ICIC", Qualcomm Europe, 7.6, FDD HeNB, 3GPP TSG-RAN WG4 #52bis, R4-093726, Oct. 12-16, 2009, 02 pages.

Office Action for JP Patent Application No. 2015-525076, dated Apr. 10, 2018, 05 pages of Office Action and 05 pages of English Translation.

"Further Discussion on HeNB Downlink Power Setting in HetNet", 3GPP TSG-RAN WG1 #63, R1-106009, Jacksonville, USA, Nov. 15-19, 2010, 06 pages.

"Network Assisted Home eNodeB Transmission Power Control in Downlink", TSG-RAN Working Group 4 (Radio) meeting #52bis, R4-093619, Miyazaki, Japan, Oct. 12-16, 2009, 07 pages.

\* cited by examiner

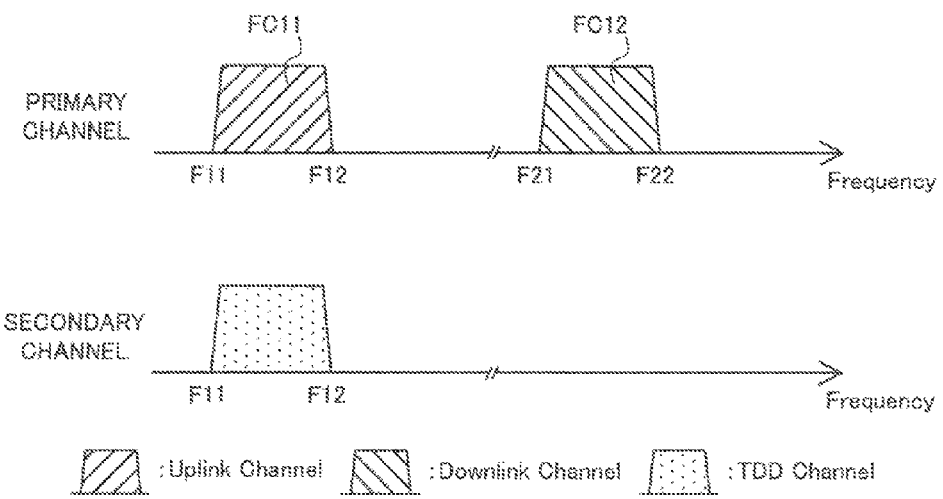
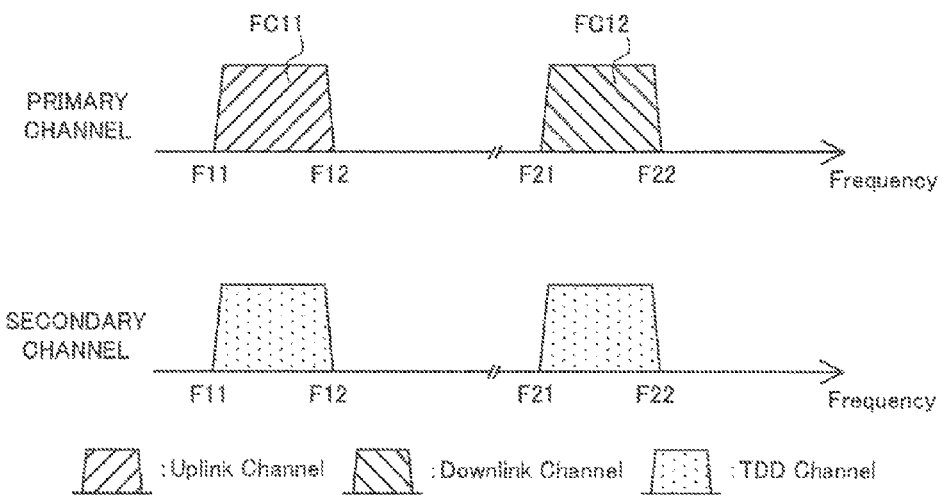

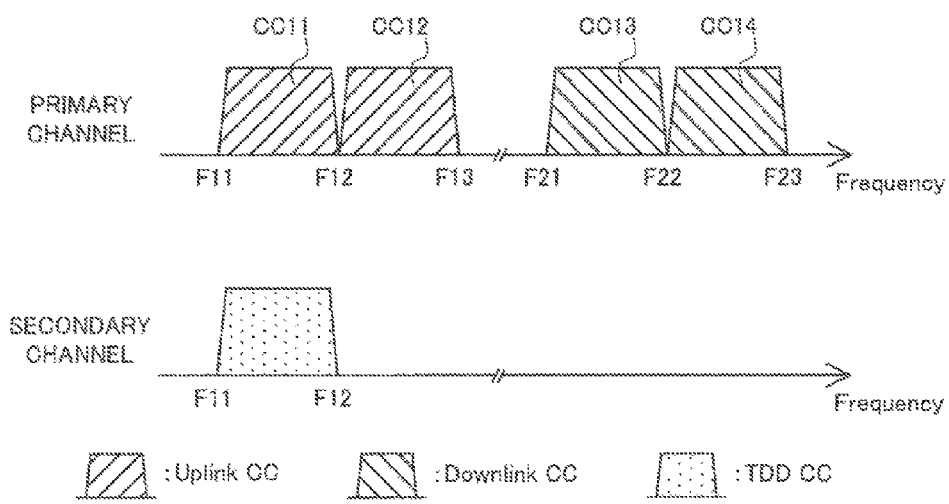
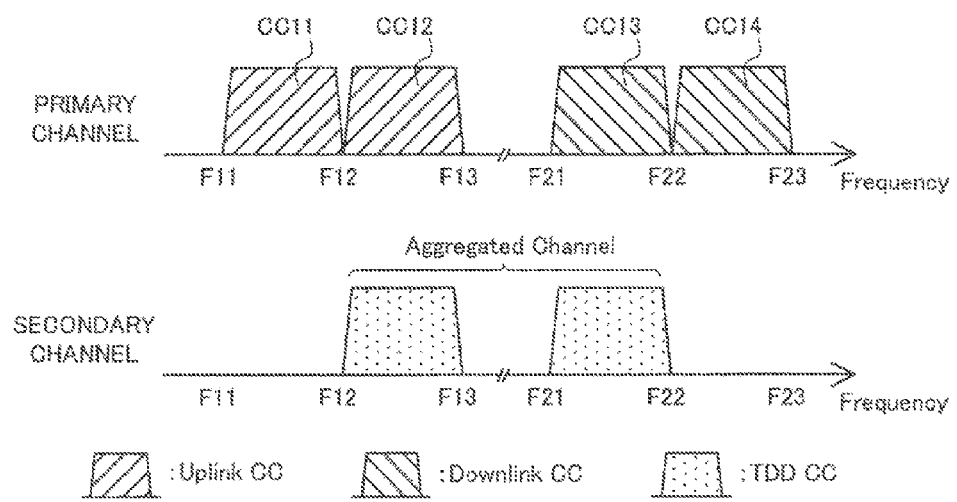

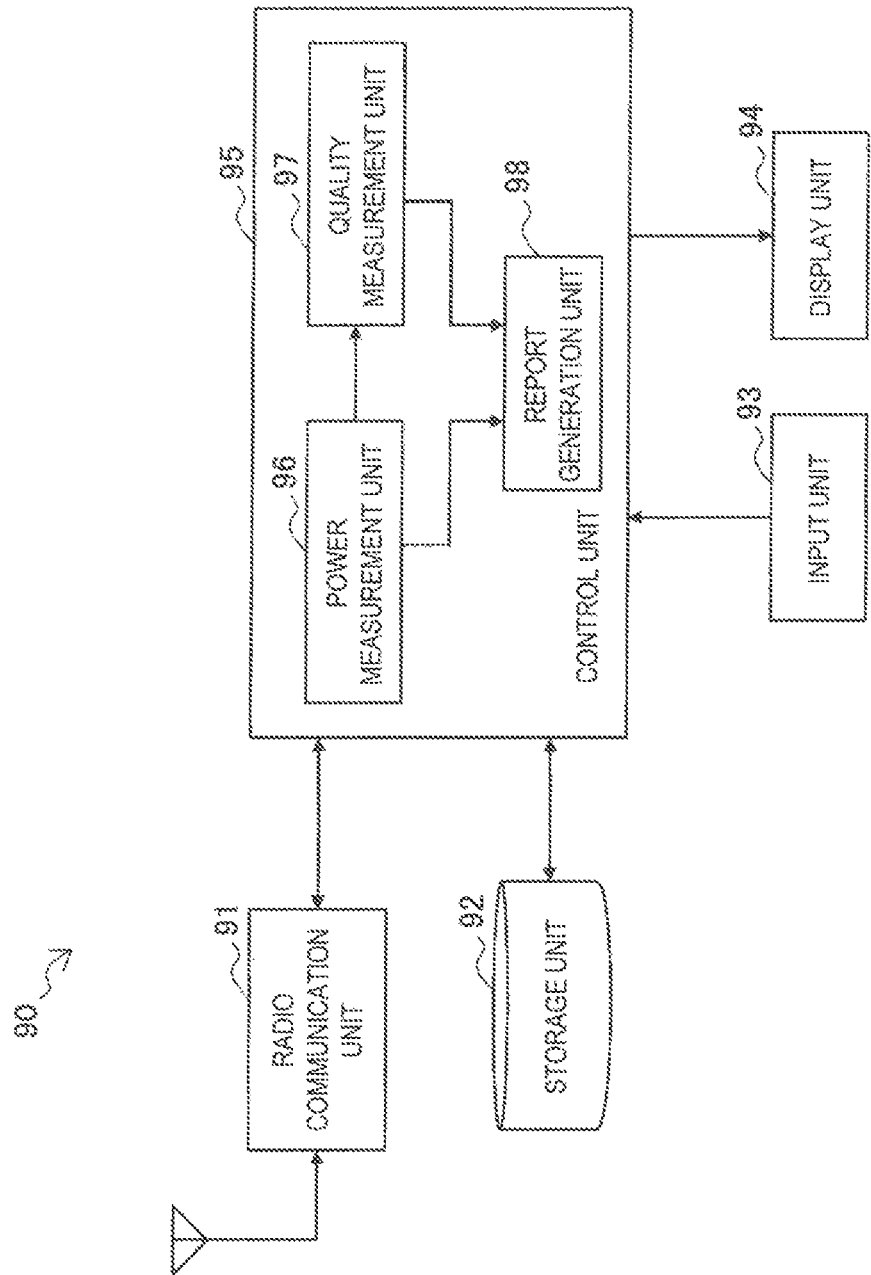

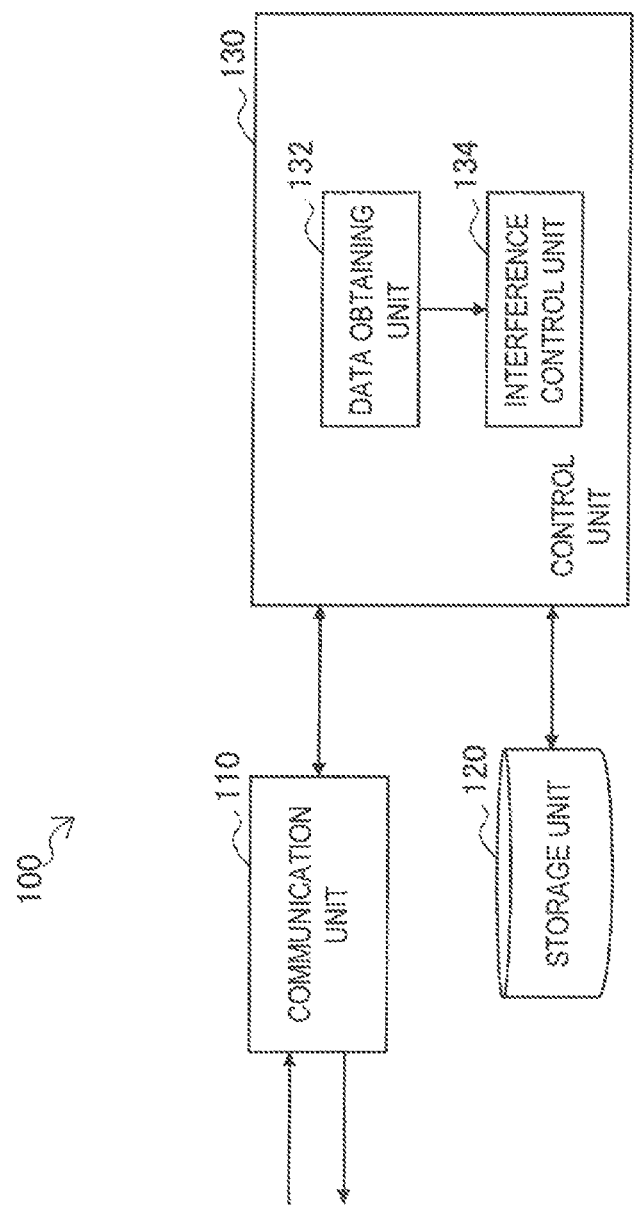

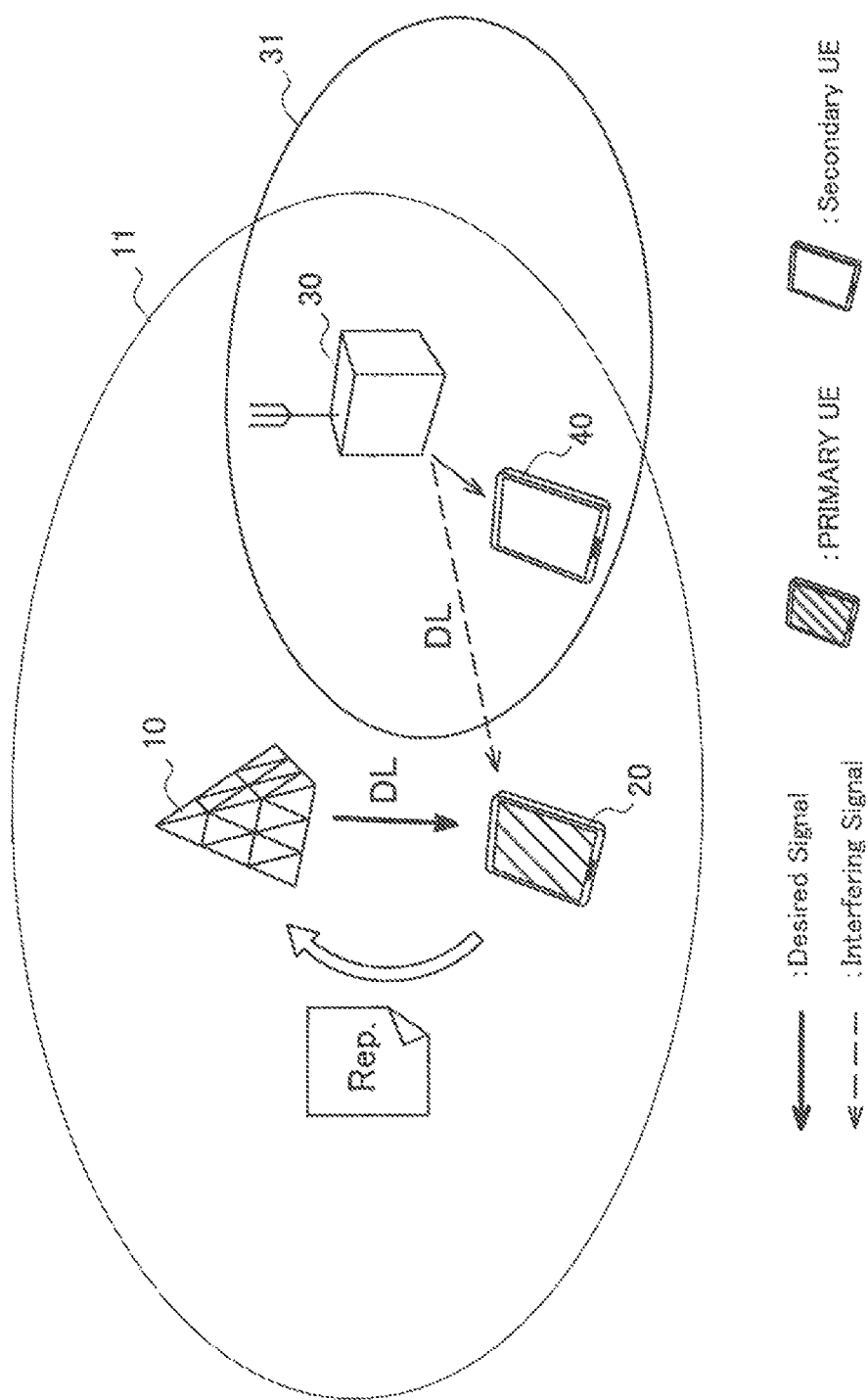

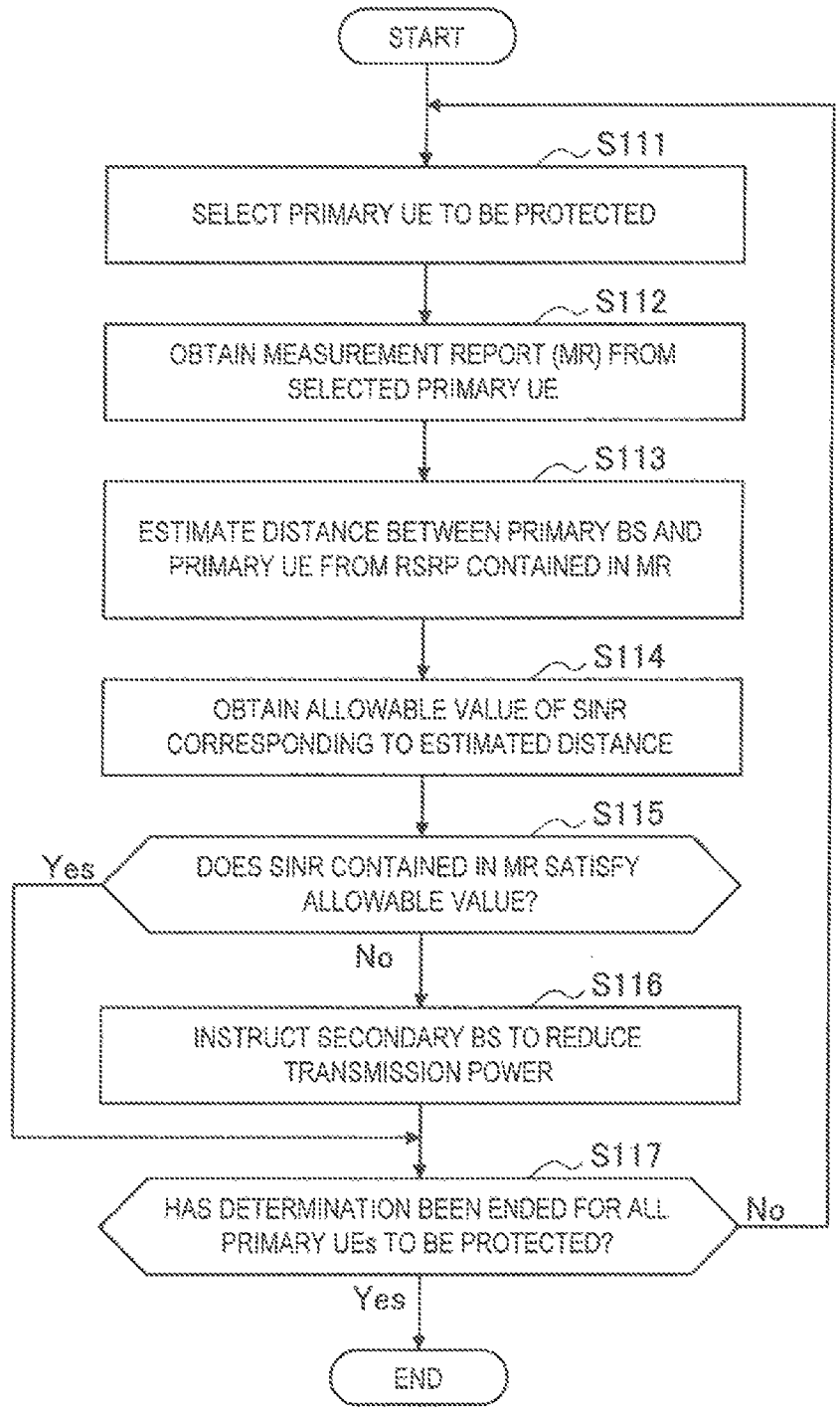

COMMUNICATION CONTROL DEVICE, COMMUNICATION CONTROL METHOD, RADIO COMMUNICATION SYSTEM, AND TERMINAL DEVICE

TECHNICAL FIELD

The present disclosure relates to a communication control device, a communication control method, a radio communication system, and a terminal device.

BACKGROUND ART

Recent radio communication environments have faced problems of depletion of frequency resources caused due to a rapid increase in data traffic. Accordingly, to increase network density and improve resource efficiency, network configurations in which a plurality of cells including macro cells and small cells are disposed in an overlapping manner can be adopted. For example, heterogeneous networks are networks that are formed in such a manner that various cells in which radio access technologies, cell sizes, or frequency bands differ coexist.

Small cells may, for example, be provided to cover a hot spot, where a significant amount of traffic occurs. Note that hot spots change dynamically, and therefore, it is not always easy to provide a small cell at a location suitable for a hot spot. When a plurality of overlapping cells are provided, it is also important to prevent the cells from adversely interfering with each other. Patent Literature 1 describes a technique for preventing such adverse interference from occurring in a radio communication system. In the technique, a device that will secondarily use a frequency channel senses a state of communication in a primary system or collects sensed data, and based on the communication state, determines whether or not the secondary use is allowed, in advance.

CITATION LIST

Patent Literature

Patent Literature 1: JP 2010-193433A

SUMMARY OF INVENTION

Technical Problem

However, the new introduction of an arrangement for sensing the communication state requires correspondingly high cost. If the adverse interference can be prevented by using an existing arrangement at low cost instead of the above sensing, the secondary use of a frequency channel can be promoted, resulting in an increase in network efficiency.

Under the above circumstances, it is an object of the technology according to the present disclosure to prevent the adverse interference by using an existing arrangement when a frequency channel is secondarily used.

Solution to Problem

According to the present disclosure, there is provided a communication control device including: an obtaining unit configured to, in a radio communication system including a primary base station to which a primary terminal is connected, and a secondary base station to which a secondary terminal is connected by secondarily using a frequency channel for the primary base station, obtain at least one of a quality report containing a communication quality indicator measured by the primary terminal and a quality report containing a communication quality indicator measured by the secondary terminal; and an interference control unit configured to instruct the secondary base station to reduce transmission power, when it is determined that adverse interference is present in the radio communication system, based on the communication quality indicator contained in the quality report obtained by the obtaining unit.

According to the present disclosure, there is provided a communication control method executed by a communication control device in a radio communication system including a primary base station to which a primary terminal is connected, and a secondary base station to which a secondary terminal is connected by secondarily using a frequency channel for the primary base station, the communication control method including: obtaining at least one of a quality report containing a communication quality indicator measured by the primary terminal and a quality report containing a communication quality indicator measured by the secondary terminal; determining whether or not adverse interference is present in the radio communication system, based on the communication quality indicator contained in the obtained quality report; and instructing the secondary base station to reduce transmission power, if determining that the adverse interference is present.

According to the present disclosure, there is provided a radio communication system including: a primary base station to which a primary terminal is connected; a secondary base station to which a secondary terminal is connected by secondarily using a frequency channel for the primary base station; and a cooperation manager configured to instruct the secondary base station to reduce transmission power, if it is determined that adverse interference is present in the system, based on a communication quality indicator contained in at least one of a quality report containing the communication quality indicator measured by the primary terminal and a quality report containing the communication quality indicator measured by the secondary terminal.

According to the present disclosure, there is provided a terminal device operable in a radio communication system including a primary base station to which a primary terminal is connected, and a secondary base station to which a secondary terminal is connected by secondarily using a frequency channel for the primary base station, the terminal device including: a control unit configured to generate a quality report containing a communication quality indicator used by a control node configured to determine whether or not adverse interference is present in the radio communication system, the communication quality indicator being used for the determination; and a radio communication unit configured to transmit the quality report generated by the control unit to a base station to which the terminal device is connected.

Advantageous Effects of Invention

The technology according to the present disclosure provides an arrangement that can prevent the adverse interference when a frequency channel is secondarily used, at low cost.

BRIEF DESCRIPTION OF DRAWINGS

FIG. 2A is an explanatory diagram for explaining first example secondary use of a frequency channel.

FIG. 2B is an explanatory diagram for explaining second example secondary use of a frequency channel.

FIG. 2C is an explanatory diagram for explaining third example secondary use of a frequency channel.

FIG. 2D is an explanatory diagram for explaining fourth example secondary use of a frequency channel.

FIG. 6 is a block diagram showing an example configuration of a terminal device according to an embodiment.

FIG. 7 is a block diagram showing an example configuration of a cooperation manager according to an embodiment.

FIG. 8 is an explanatory diagram showing a relationship between a base station and a terminal in a first interference scenario.

FIG. 9 is a flowchart showing an example flow of a communication control process that is performed by a cooperation manager in the first interference scenario.

DESCRIPTION OF EMBODIMENTS

Hereinafter, preferred embodiments of the present disclosure will be described in detail with reference to the appended drawings. Note that, in the present description and the drawings, elements that have substantially the same function and structure are denoted with the same reference signs, and repeated explanation is omitted.

Figure 1:
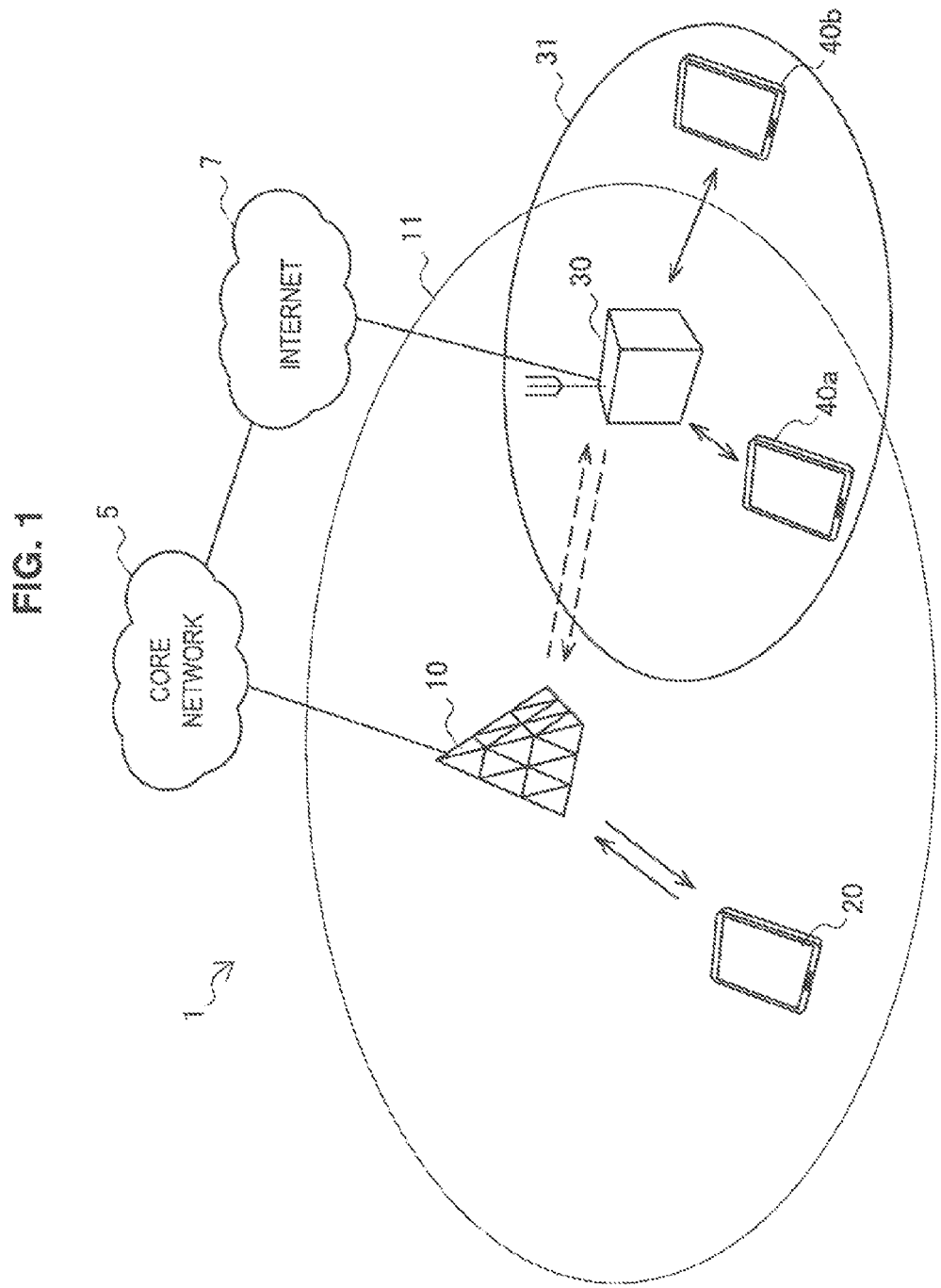
FIG. 1 is an explanatory diagram for explaining an overview of a radio communication system according to an embodiment.

Description will be provided in the following order.
1. Overview of system
2. Example configuration of terminal device
3. Example configuration of cooperation manager
4. Example interference scenarios
 4-1. First interference scenario
 4-2. Second interference scenario
 4-3. Third interference scenario
 4.4. Fourth interference scenario
 4-5. Fifth interference scenario
 4-6. Sixth interference scenario
5. Conclusion 1. Overview of System FIG. 1 is an explanatory diagram for explaining an overview of a radio communication system 1 according to an embodiment of the technology according to the present disclosure. Referring to FIG. 1, the radio communication system 1 includes a primary base station 10, a primary terminal 20, a secondary base station 30, and secondary terminals 40a and 40b.

The primary base station 10 is a base station to which one or more primary terminals are connected. The primary base station 10 manages a primary cell 11 using a frequency channel for which the primary base station 10 is, for example, legally allowed, or authorized to use. The primary base station 10 is connected to a core network 5. The primary terminal 20, which is located in the primary cell 11, is connected to the primary base station 10. When the primary base station 10 manages the primary cell 11 using the frequency division duplex (FDD) scheme, a frequency channel from the primary terminal 20 to the primary base station 10 is called an uplink (UL) channel, and a frequency channel from the primary base station 10 to the primary terminal 20 is called a downlink (DL) channel. When the primary base station 10 manages the primary cell 11 using the time division duplex (TDD) scheme, the link direction of a frequency channel between the primary terminal 20 and the primary base station 10 is switched at time intervals, such as, for example, a sub-frame or the like.

The secondary base station 30 is a base station to which one or more secondary terminals are connected. The secondary base station 30 manages a secondary cell 31 by secondarily using a frequency channel for the primary base station 10. The secondary terminals 40a and 40b, which are located in the secondary cell 31, are connected to the secondary base station 30. As an example, the secondary cell 31 may be a small cell. As used herein, small cells encompass femtocells, nanocells, picocells, microcells, and the like. There is a communication link between the secondary base station 30 and the primary base station 10. The communication link between the primary base station 10 and the secondary base station 30 may be a wired link or a wireless link. Also, the secondary base station 30 may be connected to the primary base station 10 through the core network 5 and the Internet 7.

The primary base station 10 and the secondary base station 30 may each operate as an evolved Node B (eNB) according to the Long Term Evolution (LTE) standard or the LTE-Advanced (LTE-A) standard, for example. Alternatively, the primary base station 10 and the secondary base station 30 may operate according to other cellular communication standards, such as the Wideband-Code Division Multiple Access (W-CDMA) standard, the CDMA2000 standard, and the like.

The primary terminal 20, the secondary terminal 40*a*, and the secondary terminal 40*b* may each, for example, operate as user equipment (UE) according to the LTE standard or the LTE-A standard. Alternatively, the primary terminal 20, the secondary terminal 40*a*, and the secondary terminal 40*b* may operate according to other cellular communication standards, such as the W-CDMA scheme, the CDMA2000 standard, and the like. The primary terminal 20, the secondary terminal 40*a*, and the secondary terminal 40*b* may be any radio communication terminal, such as, for example, a smartphone, tablet terminal, personal computer (PC), personal digital assistant (PDA), portable navigation device (PNA), game console, or the like. Note that, herein, when it is not necessary to distinguish the secondary terminals 40*a* and 40*b* from each other, these secondary terminals are collectively referred to as the secondary terminals 40 by removing the alphabet letter at the end of the reference character. The same applies to the other components.

In the FDD scheme, different frequency channels are used for transmission and reception. Therefore, transmission and reception can be performed at the same timing, and interference does not occur between transmission time slots and reception time slots. Because of such advantages, it is believed that the FDD scheme is suitable for the case where a large region should be covered by a plurality of macrocells. A number of macrocells may be managed according to the FDD scheme. The primary cell 11 illustrated in FIG. 1 may typically be a macrocell. On the other hand, it is becoming difficult to accommodate recently rapidly increasing data traffic using only macrocells. Therefore, a small cell is provided in a hot spot, where a significant amount of traffic occurs locally. If a small cell base station covers terminals located in a hot spot, not only the traffic load is distributed, but also communication quality in the hot spot is improved, and as a result, the system capacity may also be improved by the effect of link adaptation. The secondary cell 31 illustrated in FIG. 1 may typically be such a small cell. In hot spots, the ratio of uplink traffic and downlink traffic may change dynamically. In the TDD scheme, such dynamically changing traffic can be efficiently processed by controlling a duty ratio (the ratio of the time amount of UL time slots and the time amount of DL time slots). Therefore, small cells as an example may be managed according to the TDD scheme. Note that when there are a plurality of overlapping cells managed according to the TDD scheme, it is necessary for the cells to be highly precisely synchronized together and have the same duty ratio in order to avoid interference between UL time slots and DL time slots, and therefore, the above advantages of the TDD scheme are reduced. Therefore, in the radio communication system 1, for example, while a hot spot in the primary cell 11 managed according to the FDD scheme may be covered by the secondary cell 31 managed according to the TDD scheme, the secondary cell 31 may be provided without overlapping any other secondary cell. In this case, interference between the primary cell 11 and the secondary cell 31 is the only interference that can occur in the radio communication system 1.

FIGS. 2A-2D are each an explanatory diagram for explaining example secondary use of a frequency channel. An upper portion of FIG. 2A shows two frequency channels (primary channels) FC11 and FC12 that are used by the primary cell 11. The frequency channel FC11 is, for example, an uplink channel that occupies a band ranging from a frequency F11 to a frequency F12. The frequency channel FC12 is, for example, a downlink channel that occupies a band ranging from a frequency F21 to a frequency F22. A lower portion of FIG. 2A shows a secondary channel that is secondarily used by the secondary cell 31. In the example of FIG. 2A, the frequency channel FC11 is secondarily used as a secondary channel.

An upper portion of FIG. 2B shows the same two frequency channels FC1 and FC12 as those of FIG. 2A again. The frequency channels FC11 and FC12 are a primary channel that is used by the primary cell 11. In a lower portion of FIG. 2B, the frequency channels FC11 and FC12 are both secondarily used. For example, the frequency channel FC11 may be used by the secondary cell 31, and the frequency channel FC12 may be used by another secondary cell (and vice versa).

An upper portion of FIG. 2C shows four frequency channels CC11, CC12, CC13, and CC14. These frequency channels are each a component carrier (CC) in the LTE-A carrier aggregation technology. The frequency channel CC11 is an uplink CC that occupies a band ranging from a frequency F11 to a frequency F12. The frequency channel CC12 is an uplink CC that occupies a band ranging from the frequency F12 to a frequency F13. The frequency channels CC11 and C12 may be aggregated by the carrier aggregation technology to form an uplink aggregated channel. Also, the frequency channel CC13 is a downlink CC that occupies a band ranging from a frequency F21 to a frequency F22. The frequency channel CC14 is a downlink CC that occupies a band ranging from the frequency F22 to a frequency F23. The frequency channels CC13 and C14 may be aggregated by the carrier aggregation technology to form a downlink aggregated channel. A lower portion of FIG. 2C shows a secondary channel that is secondarily used by the secondary cell 31. In the example of FIG. 2C, the frequency channel CC11 is secondarily used as a secondary channel.

An upper portion of FIG. 2D shows the same four frequency channels CC11, CC12. CC13, and CC14 as those of FIG. 2C. The frequency channels CC11 and C12 may be aggregated by the carrier aggregation technology to form an uplink aggregated channel for the primary cell 11. Also, the frequency channels CC13 and C14 may be aggregated by the carrier aggregation technology to form a downlink aggregated channel for the primary cell 11. A lower portion of FIG. 2D shows two secondary channels that are secondarily used by the secondary cell 31. In the example of FIG. 21), the frequency channels CC12 and CC13 are a secondary channel. The frequency channels CC12 and C13 may be aggregated by the carrier aggregation technology to form an aggregated channel (e.g., may be managed by the TDD scheme) for the secondary cell 31.

Note that resource allocation information (for resource block allocation or PUSCH allocation, etc.) may be distributed on each of a plurality of component carriers included in an aggregated channel or on a component carrier having lowest observed interference. For example, the secondary terminal 40 transmits a quality report containing a communication quality indicator for each component carrier of an aggregated channel, to the secondary base station 30. Thereafter, the secondary base station 30 may select a component carrier that is to be used in transmitting resource allocation information to the secondary terminal 40, using the communication quality indicator for each component carrier. As a result, a reduction in performance due to transmission error of resource allocation information can be reduced. The amount of interference for each component carrier may be estimated using various techniques described below.

Figure 3A:
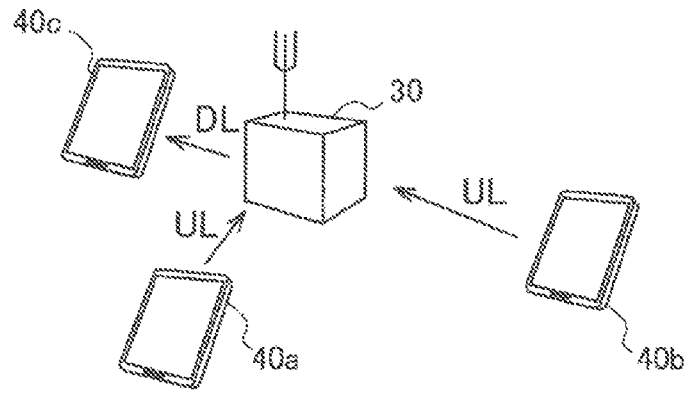
FIG. 3A is a first explanatory diagram for explaining a duty ratio in the TDD scheme.
Figure 3B:
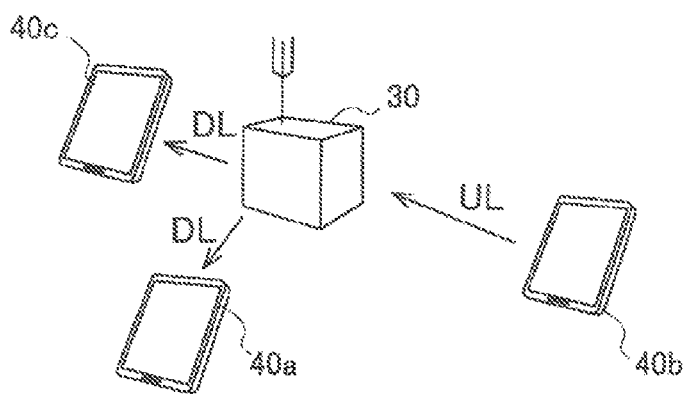
FIG. 3B is a second explanatory diagram for explaining a duty ratio in the TDD scheme.

FIGS. 3A and 3B are explanatory diagrams for explaining a duty ratio in the TDD scheme. In a first example of FIG. 3A, secondary terminals 40a and 40b have uplink traffic while a secondary terminal 40c has downlink traffic. In this case, in the entire system, the amount of uplink traffic is greater than the amount of downlink traffic, and therefore, a duty ratio having a larger number of UL time slots may be selected. As an example, FIG. 3A shows a configuration of 10 sub-frames included in a radio frame having a time length of 10 msec. Here, one radio frame includes six UL sub-frames (labeled with the letter "U"), two DL sub-frames (labeled with the letter "D"), and two special sub-frames (labeled with the letter "S"). Note that special sub-frames are a sub-frame including a guard interval, that is inserted when the link is switched from downlink to uplink.

In contrast to this, in a second example of FIG. 3B, a secondary terminal 40a has uplink traffic while secondary terminals 40b and 40c have downlink traffic. In this case, in the entire system, the amount of downlink traffic is greater than the amount of uplink traffic, and therefore, a duty ratio having a larger number of DL time slots may be selected. As an example, a radio frame shown in FIG. 3B includes two UL sub-frames, six DL sub-frames, and two special sub-frames. By thus changing the duty ratio applied to the secondary cell 31, depending on the state of traffic in a cell, the secondary base station 30 can efficiently process traffic in a hot spot that changes dynamically.

It is important to prevent adverse interference in the radio communication system 1 no matter whether the primary cell 11 and the secondary cell 31 are managed according to the FDD scheme or according to the TDD scheme. According to the technique disclosed in Patent Literature 1, a secondary base station or a secondary terminal senses communication states therearound or collects sensed data in advance before determining whether or not a frequency channel protected for a primary cell can be secondarily used. For example, when a radio signal of a primary system has been detected as a result from sensing, it may be determined that secondary use is not to be performed, in order to prevent adverse interference from occurring in the primary system. However, the new introduction of an arrangement for sensing a communication state requires correspondingly high cost. Therefore, in this embodiment, instead of such sensing, an existing quality report arrangement is used to determine the occurrence of adverse interference or the risk thereof. The quality report that may be herein used may be, for example, a measurement report or a channel quality indicator (CQI) report.

The measurement report is a report containing a determination indicator used in determining handover, which is transmitted from a terminal to a base station. The measurement report typically contains a received power indicator for a reference signal, such as reference signal received power (RSRP). For example, a measurement report that is transmitted from the primary terminal 20 to the primary base station 10 contains RSRP for a reference signal from the primary base station 10, which is a serving base station, and RSRP for a reference signal from one or more neighboring base stations (e.g., the secondary base station 30). In this embodiment, in addition to this, it is assumed that a terminal incorporates a communication quality indicator into a measurement report. The communication quality indicator may be, for example, a signal-to-interference and noise power ratio (SINR) or a signal-to-interference power ratio (SIR). Most existing terminals have an application programming interface (API) for measuring the SINR or SIR, and therefore, a measurement report can be modified to contain such a communication quality indicator, at less implementation cost. Note that the term "reference signal" as used herein may be replaced with another term, such as a pilot signal, beacon signal, or the like, depending on the communication scheme to which the technology according to the present disclosure is applied.

Figure 4A:
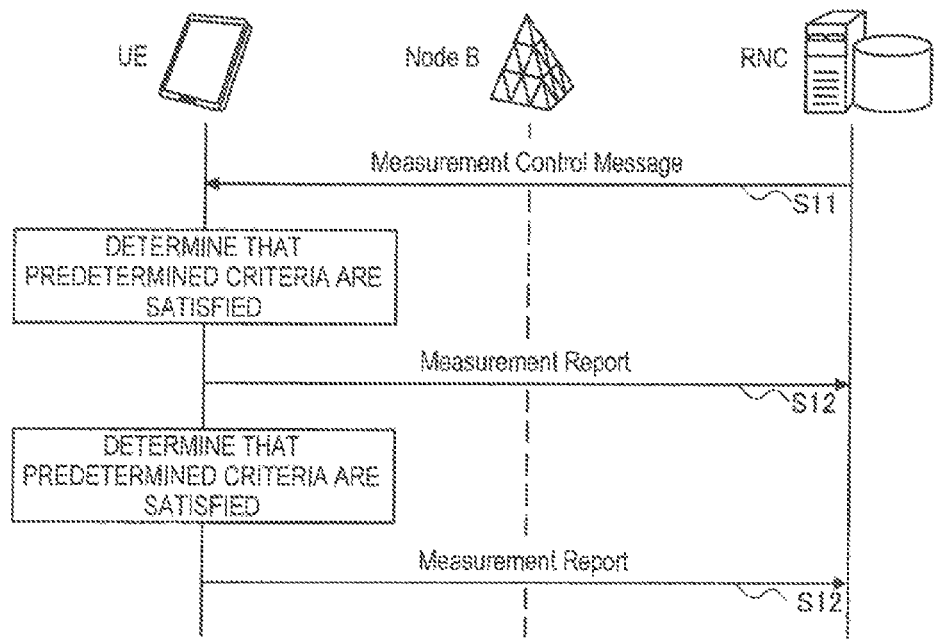
FIG. 4A is a first explanatory diagram for explaining transmission of a measurement report.
Figure 4B:
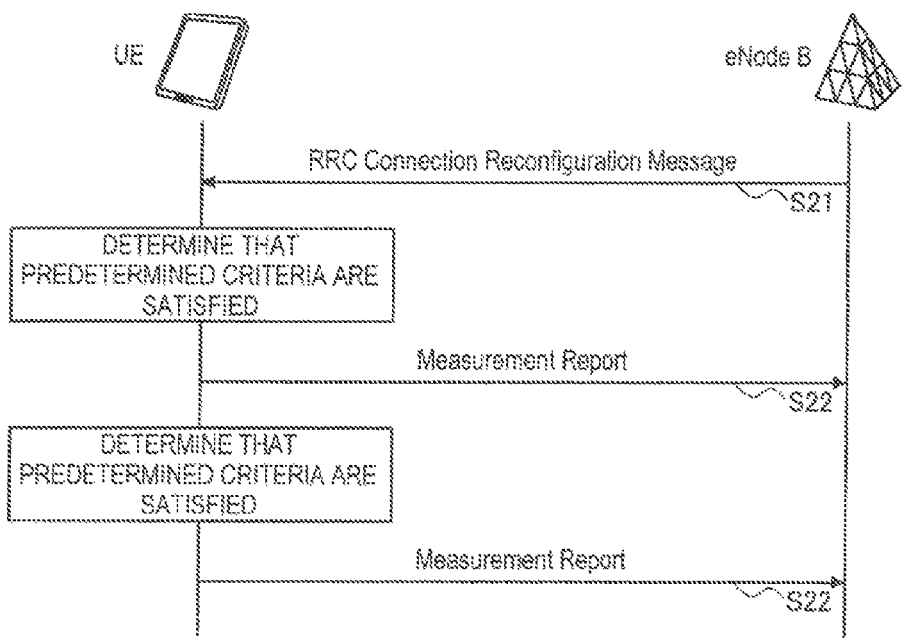
FIG. 4B is a second explanatory diagram for explaining transmission of a measurement report.

FIG. 4A and FIG. 4B are explanatory diagrams for explaining transmission of a measurement report. FIG. 4A shows a signal sequence in an UMTS terrestrial radio access network (UTRAN). A radio network controller (RNC) is a control node that is located in a core network. An RNC initially transmits a measurement control message to a terminal (UE) through a base station (NodeB) (step S11). The measurement control message indicates reporting criteria with which the UE determines a timing at which a measurement report is to be transmitted. The reporting criteria may be, for example, periodic criteria, or event-triggered criteria (e.g., based on threshold comparison of a measured indicator). If the UE determines that the reporting criteria indicated by the measurement control message are satisfied, the UE transmits a measurement report to the RNC through the NodeB (step S12). Such reporting criteria determination and measurement report transmission may be repeatedly performed.

FIG. 4B shows a signal sequence in an E-UTRAN. Initially, a base station (eNodeB) transmits an RRC connection reconfiguration message to a terminal (UE) (step S21). The RRC connection reconfiguration message indicates reporting criteria with which the UE determines a timing at which the measurement report is to be transmitted. The reporting criteria may be, for example, periodic criteria, or event-triggered criteria (e.g., based on threshold comparison of measured indicators). If the periodic criteria are employed, a reporting period may be specified within the range of, for example, 120 ms to 3600 ms. If the event-triggered criteria are employed, a suitable threshold may be specified for each of a plurality of events that are categorized. The RRC connection reconfiguration message may also indicate the type of an indicator that is to be reported. If the UE determines that the reporting criteria indicated by the RRC connection reconfiguration message are satisfied, the UE transmits a measurement report to the eNodeB (step S22). Such reporting criteria determination and measurement report transmission may be repeatedly performed.

A measurement report may contain, in addition to the above RSRP, SINR and SIR, an indicator, such as CPICH received signal code power (RSCP), CPICH energy per chip divided by the power density (Ec/No), pilot power, energy per chip per interference density measured on the pilot channel (Ec/Io), reference signal received quality (RSRQ), an signal to noise ratio (SNR), or the like.

In this embodiment, introduced is a cooperation manager 100 that is a functional entity for determining the occurrence of adverse interference in the radio communication system 1. The cooperation manager 100 obtains at least one of a quality report containing a communication quality indicator measured by a primary terminal and a quality report containing a communication quality indicator measured by a secondary terminal, and based on the communication quality indicator contained in the obtained quality report, determines the occurrence of adverse interference (or the risk thereof).

Figure 5A:
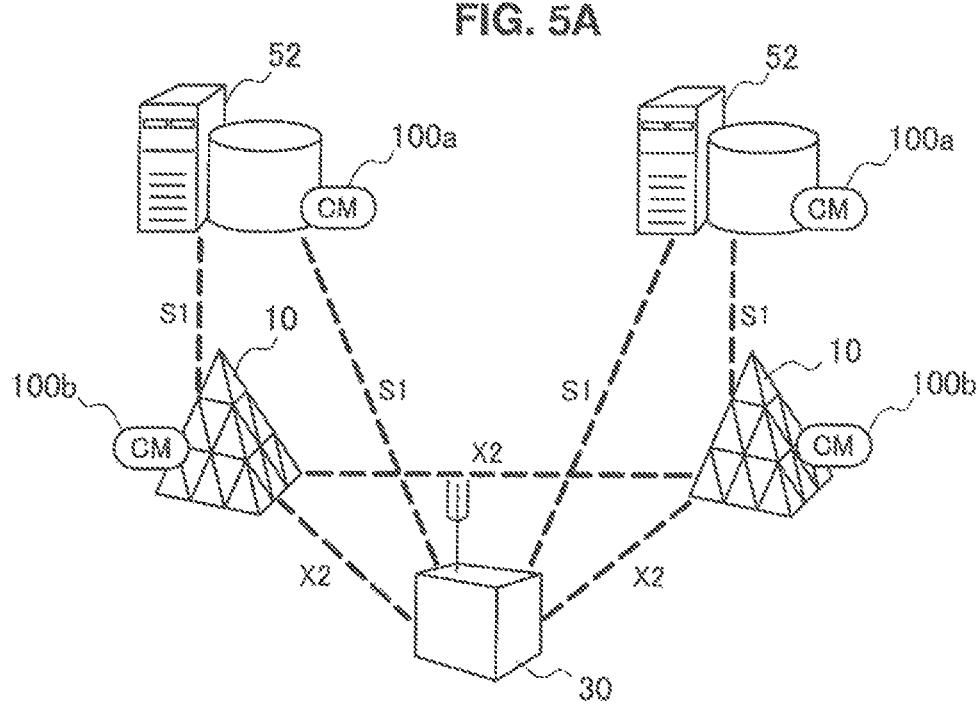
FIG. 5A is an explanatory diagram for explaining a first example and a second example of introduction of a cooperation manager.

FIG. 5A is an explanatory diagram for explaining a first example and a second example of the introduction of a cooperation manager. In the first example, a cooperation manager 100a is provided on a control node 52 in the core network 5. The control node 52 may be a node of any type, such as, for example, the Mobility Management Entity (MME), PDN-Gateway (P-GW), Serving-Gateway (S-GW), or the like The cooperation manager 100a can obtain a measurement report generated by a primary terminal or a secondary terminal, from the primary base station 10 and the secondary base station 30, through a core network-base station interface, such as, for example, the S1 interface or the like.

In the second example, a cooperation manager 100b is provided on the primary base station 10. The cooperation manager 100b can directly receive a measurement report from a primary terminal, or can receive a measurement report generated by a primary terminal or a secondary terminal from another base station through an inter-base station interface, such as the X2 interface or the like.

Figure 5B:
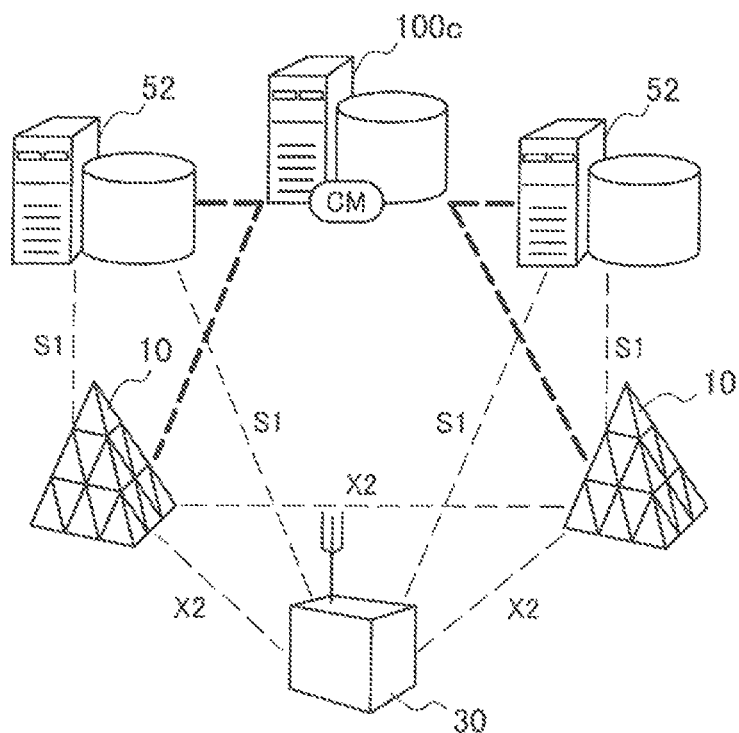
FIG. 5B is an explanatory diagram for explaining a third example of introduction of a cooperation manager.

FIG. 5B is an explanatory diagram for explaining a third example of the introduction of a cooperation manager. In the third example, a cooperation manager 100c is provided as a new dedicated control node in the core network 5. The cooperation manager 100c can obtain a measurement report from another control node 52, the primary base station 10, or the secondary base station 30, through a newly implemented interface.

2. Example Configuration of Terminal Device

FIG. 6 is a block diagram showing an example configuration of a terminal device according to this embodiment. A terminal device 90 shown in FIG. 6 is dealt with as the primary terminal 20 when the terminal device 90 is connected to the primary base station 10, and is dealt with as the secondary terminal 40 when the terminal device 90 is connected to the secondary base station 30. The terminal device 90 can be handed over from the primary base station 10 to the secondary base station 30 or from the secondary base station 30 to the primary base station 10. Referring to FIG. 6, the terminal device 90 includes a radio communication unit 91, a storage unit 92, an input unit 93, a display unit 94, and a control unit 95.

The radio communication unit 91 is a radio communication interface that has one or more antennas, and operates according to the FDD scheme or the TDD scheme. The radio communication unit 91 detects a cell that is managed in the vicinity of the terminal device 90, by a cell search procedure, and connects to one of connectable base stations that is expected to have best communication quality (e.g., highest received power of a reference signal). A base station to which a terminal is connected is referred to as a serving base station for the terminal. The radio communication unit 91 transmits an uplink signal to a serving base station, and receives a downlink signal from a serving base station. The maximum transmission power of an uplink signal transmitted from the radio communication unit 91 is set to be greater as the transmission power of a reference signal set from a serving base station increases.

The storage unit 92 stores a program and data for operating the terminal device 90, using a storage medium, such as a hard disk, semiconductor memory, or the like.

The input unit 93, which includes, for example, a touch sensor for detecting a touch on the screen of the display unit 94, a keypad, a keyboard, a button, or a switch, or the like, receives an operation or information input by the user.

The display unit 94, which has a screen, such as a liquid crystal display (LCD), organic light emitting diode (OLED) display, or the like, displays an output image of the terminal device 90.

The control unit 95 controls all operations of the terminal device 90 using a central processing unit (CPU) or a system on chip (SoC). In this embodiment, the control unit 95 includes a power measurement unit 96, a quality measurement unit 97, and a report generation unit 98.

The power measurement unit 96 measures the power of a received signal received by the radio communication unit 91 to generate a received power indicator. For example, when the terminal device 90 is connected to the primary base station 10, the power measurement unit 96 may measure the received power of a reference signal of the primary base station 10 received by the radio communication unit 91 to generate RSRP indicating the measured value as a received power indicator. Also, when the terminal device 90 is connected to the secondary base station 30, the power measurement unit 96 may measure received power of a reference signal of the secondary base station 30 received by the radio communication unit 91 to generate RSRP indicating the measured value as a received power indicator. Thereafter, the power measurement unit 96 outputs the generated received power indicator to the quality measurement unit 97 and the report generation unit 98.

The quality measurement unit 97 measures communication quality of a received signal received by the radio communication unit 91 to generate a communication quality indicator. For example, when the terminal device 90 is connected to the primary base station 10, the quality measurement unit 97 may measure communication quality for a frequency channel between the primary base station 10 and the terminal device 90 to generate an SINR indicating the measured value as a communication quality indicator. Also, when the terminal device 90 is connected to the secondary base station 30, the quality measurement unit 97 may measure communication quality for a frequency channel between the secondary base station 30 and the terminal device 90 to generate an SINR indicating the measured value as a communication quality indicator. During the measurement of communication quality, the quality measurement unit 97 may use a received power indicator input from the power measurement unit 96. Thereafter, the quality measurement unit 97 outputs the generated communication quality indicator to the report generation unit 98.

The report generation unit 98 determines whether or not the reporting criteria indicated by the measurement control message described with reference to FIG. 4A or the RRC connection reconfiguration message described with reference to FIG. 4B are satisfied. Also, the report generation unit 98 generates a measurement report containing the received power indicator input from the power measurement unit 96 and the communication quality indicator input from the quality measurement unit 97. Thereafter, if the reporting criteria are satisfied, the report generation unit 98 transmits the generated report from the radio communication unit 91 to a serving base station on an uplink channel or uplink time slot(s). Note that, instead of a measurement report, the report generation unit 98 may generate a CQI report containing the above received power indicator and communication quality indicator, and transmits the generated CQI report from the radio communication unit 91 to a serving base station.

3. Example Configuration of Cooperation Manager

FIG. 7 is a block diagram showing an example configuration of the cooperation manager 100 according to this embodiment. Referring to FIG. 7, the cooperation manager 100 includes a communication unit 110, a storage unit 120, and a control unit 130.

The communication unit 110 is a communication interface for allowing the cooperation manager 100 to communicate with other nodes in the radio communication system 1. When the cooperation manager 100 is provided on a control node (an existing or new one) in the core network 5, the communication unit 110 may, for example, be provided with the S1 interface between the primary base station 10 and the secondary base station 30. When the cooperation manager 100 is provided on a primary base station, the communication unit 110 may, for example, be provided with the X2 interface between itself and other base stations.

The storage unit 120 stores a program and data for operating the cooperation manager 100, using a storage medium, such as a hard disk, semiconductor memory, or the like.

The control unit 130 controls all operations of the cooperation manager 100 using a CPU or SoC. In this embodiment, the control unit 130 includes a data obtaining unit 132 and an interference control unit 134.

The data obtaining unit 132 obtains at least one of a quality report generated by the primary terminal 20 and a quality report generated by the secondary terminal 40. When the cooperation manager 100 is provided on a control node in the core network 5, the data obtaining unit 132 may obtain, through the communication unit 110, a quality report generated by the primary terminal 20 from the primary base station 10, and a quality report generated by the secondary terminal 40 from the secondary base station 30. When the cooperation manager 100 is provided on the primary base station 10, the data obtaining unit 132 may obtain a quality report generated by the primary terminal 20 connected to the primary base station 10 from the primary terminal 20, and quality reports generated by other terminals from other base stations. A quality report obtained by the data obtaining unit 132 may be a measurement report or CQI report as described above. The quality report, which contains a received power indicator and a communication quality indicator, is used to determine whether or not adverse interference is present in the radio communication system 1.

The data obtaining unit 132 may also obtain additional information that may be optionally used in determining interference, such as a current transmission power value of each base station, a list of terminals currently connected, and the like. In scenarios described below, interference is determined based on location information of a base station. Therefore, the data obtaining unit 132 may also obtain location information of the primary base station 10 and the secondary base station 30. The location information may be stored in the storage unit 120 in advance, or may be dynamically measured by each base station using some known positioning technique (e.g., OPS positioning, etc.).

The interference control unit 134 determines whether or not adverse interference is present in the radio communication system 1, based on a communication quality indicator contained in a quality report obtained by the data obtaining unit 132. Thereafter, if the interference control unit 134 determines that adverse interference is present, the interference control unit 134 instructs the secondary base station 30 involved in the interference, to reduce transmission power. The interference control unit 134 may transmit a control message for instructing to reduce transmission power, from the communication unit 110 to the secondary base station 30 through, for example, the above S1 interface or X2 interface. Here, the control message transmitted may contain a label having only the meaning "reduce transmission power," or a specific target value of transmission power.

The secondary base station 30 includes a radio communication unit that has one or more antennas, and performs radio communication with one or more secondary terminals 40 by secondarily using a frequency channel for the primary base station 10, and a communication unit that transfers a quality report generated by the secondary terminal 40 to the cooperation manager 100, and receives a control message from the cooperation manager 100. The secondary base station 30, when receiving a control message that instructs to reduce transmission power from the cooperation manager 100, reduces transmission power set in the radio communication unit. The secondary base station 30 may set transmission power to a target value indicated by the control message.

In this embodiment, the determination of interference by the interference control unit 134 based on a communication quality indicator roughly includes two techniques. In the first technique, the interference control unit 134 estimates a distance between a first terminal and a first base station to which the first terminal is connected, from a received power indicator. Thereafter, when the communication quality indicator does not satisfy allowable quality depending on the estimated distance, the interference control unit 134 determines that adverse interference is present. In the second technique, the interference control unit 134 estimates a path loss between a second terminal and a second base station to which the second terminal is not connected, from an interference component of the communication quality indicator. Also, the interference control unit 134 estimates interference power in the second base station that is caused by the transmission power of the second terminal, based on the estimated path loss. Thereafter, when the estimated interference power does not satisfy allowable interference power, the interference control unit 134 determines that adverse interference is present. Note that, in the first technique, the SNR may be used as a communication quality indicator instead of the SINR or SIR.

Incidentally, when the primary terminal 20 is provided in or in the vicinity of the secondary cell 31, a downlink signal transmitted from the secondary base station 30 acts as an interference component in a communication quality indicator of the primary terminal 20. Specifically, a downlink signal from the secondary base station 30 decreases communication quality that is experienced by the primary terminal 20. The decrease is transmitted from the primary terminal 20 to the cooperation manager 100X through a quality report. Therefore, in the above second technique, the interference control unit 134 can estimate a path loss between the primary terminal 20 and the secondary base station 30 to which the primary terminal 20 is not connected, from an interference component of a communication quality indicator of a quality report generated by the primary terminal 20. Similarly, the interference control unit 134 can estimate a path loss between the secondary terminal 40 and the primary base station 10 to which the secondary terminal 40 is not connected, from an interference component of a communication quality indicator of a quality report generated by the secondary terminal 40.

In the next section, six interference scenarios in the radio communication system 1 of how the interference control unit 134 can determine the occurrence of adverse interference will be described.

4. Example Interference Scenarios

[4-1. First Interference Scenario]

In a first interference scenario, the interference control unit 134 determines the occurrence of adverse interference according to the above first technique. The first terminal is the primary terminal 20, and the first base station is the primary base station 10. Specifically, the interference control unit 134 estimates a distance between the primary terminal 20 and the primary base station 10 to which the primary terminal 20 is connected, from a received power indicator. Thereafter, the interference control unit 134 determines that adverse interference is present, if allowable quality depending on the estimated distance is not satisfied by a communication quality indicator contained in a quality report obtained from the primary terminal 20.

FIG. 8 is an explanatory diagram showing a relationship between a base station and a terminal in the first interference scenario. In FIG. 8, a desired signal is indicated by a thick line, and an interfering signal is indicated by a dashed line. In the first interference scenario, a downlink channel from the primary base station 10 to the primary terminal 20 is secondarily used by the secondary base station 30. Also, a downlink signal from the secondary base station 30 to the secondary terminal 40 acts as an interfering signal on a desired signal received by the primary terminal 20.

The received power $P_{REF1\_1}$ [W] of a reference signal that is received by the primary terminal 20 from the primary base station 10 is represented by the following formula, where $P_{REF1}$ is the transmission power of the reference signal, and $L_{1\_1}$ is a path loss between the primary base station 10 and the primary terminal 20. Note that, here, it is assumed that the antenna does not have directivity.

[Math 1]

$$P_{REF1\_1} = L_{1\_1} \cdot P_{REF1} \qquad (1)$$

Similarly, the received power $I_{REF2\_UE1}$ [W] of a reference signal that is received by the primary terminal 20 from the secondary base station 30 is represented by the following formula, where $P_{REF2}$ is the transmission power of the reference signal, and $L_{2\_1}$ is a path loss between the secondary base station 30 and the primary terminal 20.

[Math 2]

$$I_{REF2\_UE1} = L_{2\_1} \cdot P_{REF2} \qquad (2)$$

Overall interference power $I_{DL2\_UE1}$ from the secondary base station 30 that is observed by the primary terminal 20 is represented by the following formula, where $I_{REF2\_UE1}$ is received power (interference power) of a reference signal from the secondary base station 30 that is observed by the primary terminal 20, and $M_{REF2}/M_{ALL2}$ is the power ratio of all signal components to the reference signal component. Note that $M_{ALL2}$ and $M_{REF2}$ represent the total number of resource blocks in the secondary cell 31 and the number of resource blocks used for the reference signal, respectively.

[Math 3]

$$I_{DL2\_UE1} = \frac{M_{ALL2}}{M_{REF2}} \cdot I_{REF2\_UE1} \qquad (3)$$

Moreover, the $SINR_{REF1}$ of a reference signal from the primary base station that is observed by the primary terminal 20 is represented by the following formula, where $M_{ALL1}/M_{REF1}$ is the power ratio of all signal components to a reference signal component from the primary base station 10 in the primary cell 11, where $N(d_1)$ is a noise component (thermal noise, and noise in a receiver) depending on a distance $d_1$ from the primary base station 10. Note that $M_{ALL1}$ and $M_{REF1}$ represent the total number of resource blocks in the primary cell 11 and the number of resource blocks used for the reference signal, respectively.

[Math 4]

$$SINR_{REF1} = \frac{P_{REF1\_1}}{N(d_1) + \frac{M_{REF1}}{M_{ALL1}} \cdot I_{DL2\_UE1}} \qquad (4)$$

Note that when the code division multiple access (CDMA) scheme is employed, the noise component $N(d_1)$ may be obtained through a correlation with codes assigned to a pilot signal. When the orthogonal frequency division multiple access (OFDMA) scheme is employed, the noise component $N(d_1)$ may represent noise in a band of resource blocks allocated to a reference signal.

Formula (4) is derived by assuming that an interference component of an SINR measured in the primary terminal 20 is caused by the transmission power of the secondary base station 30. A control target value $P_{REF2\_TGT}$ of the transmission power of a reference signal of the secondary base station 30 may be calculated by substituting minimum allowable quality $SINR_{ALW1}$ for the $SINR_{REF1}$ in Formula (4) and modifying the formula. Note that $P_{margin}$ is backoff power that is set in order to compensate for an error that may occur due to various causes.

[Math 5]

$$P_{REF2\_TGT} = \frac{M_{REF2}}{M_{REF1} \cdot L_{2\_1}} \cdot \left\{ \frac{P_{REF1\_1}}{SINR_{ALW1}} - N(d_1) \right\} - P_{margin} \qquad (5)$$

Here, the distance $d_1$ may be represented by the following formula, where c [m/s] is the light speed, and $f_1$ [Hz] is a frequency of a reference signal of the primary base station 10.

[Math 6]

$$d_1 = \frac{c}{4\pi f_1} \cdot \sqrt{\frac{P_{REF1}}{P_{REF1\_1}}} \qquad (6)$$

Moreover, a path loss $L_{1\_2}$ can be represented by the following formula, based on Formula (2), Formula (3), and Formula (4).

[Math 7]

$$L_{1\_2} = \frac{M_{ALL1} \cdot M_{REF2}}{M_{REF1} \cdot M_{ALL2} \cdot P_{REF2}} \cdot \left\{ \frac{P_{REF1\_1}}{SINR_{REF1}} - N(d_1) \right\} \qquad (7)$$

Note that a power correction coefficient $k_1$ may be added to Formula (5) as follows. The power correction coefficient $k_1$ may, for example, be the ratio of the transmission power of another downlink signal to the transmission power of a reference signal.

[Math 8]

$$P_{REF2\_TGT} = \frac{M_{REF2}}{k_1 \cdot M_{REF1} \cdot L_{2\_1}} \cdot \left\{ \frac{P_{REF1\_1}}{SINR_{ALW1}} - N(d_1) \right\} - P_{margin} \quad (8)$$

Also, the following power correction coefficient $k_2$ depending on the duty ratio of the secondary cell 31 may be used instead of or in addition to the power correction coefficient $k_1$. When the secondary cell 31 is managed according to the TDD scheme, the power correction coefficient $k_2$ is used to change the control target value $P_{REF2\_TGT}$ of the transmission power of a reference signal from the secondary base station 30, depending on the ratio of UL time slots and DL time slots. Note that, for example, $T_{DL}$ may correspond to the number of DL sub-frames (or DL sub-frames and special sub-frames) in one radio frame, and $T_{UL}$ may correspond to the number of UL sub-frames in one radio frame.

[Math 9]

$$k_2 = \frac{T_{DL}}{T_{UL} + T_{DL}} \quad (9)$$

FIG. 9 is a flowchart showing an example flow of a communication control process that is performed by the cooperation manager 100 in the first interference scenario. The communication control process described here may be repeatedly performed at regular or variable intervals, or may be performed according to a request from any terminal or base station.

Referring to FIG. 9, initially, the interference control unit 134 selects a primary terminal that is to be protected from interference (step S111). Next, the interference control unit 134 obtains a measurement report from the selected primary terminal (step S112). Next, the interference control unit 134 estimates a distance between a primary base station and a primary terminal according to Formula (6), from RSRP and the transmission power of a corresponding reference signal that are contained in the obtained measurement report (step S113). Next, the interference control unit 134 obtains an allowable value $SINR_{ALW1}$ of SINR corresponding to the estimated distance (step S1114). Note that a table in which various distances are associated with corresponding allowable values of SINR, may be stored in the storage unit 120 in advance. Next, the interference control unit 134 determines whether or not an SINR contained in a measurement report from the selected primary terminal satisfies allowable quality (i.e., whether or not the SINR exceeds the allowable value $SINR_{ALW1}$) (step S115). Here, if it is determined that the measured SINR does not satisfy allowable quality, the interference control unit 134 instructs a secondary base station to reduce transmission power (step S116). Such a process is repeated for each of primary terminals that are to be protected from interference (step S117). Thereafter, if the interference determination has been ended for all primary terminals, the communication control process shown in FIG. 9 is ended.

Note that, instead of instructing a secondary base station to reduce transmission power after the interference determination has been performed for each primary terminal as in the example of FIG. 9, a secondary base station may be instructed to reduce transmission power only once after the interference determination has been performed for all primary terminals. In the latter case, the interference control unit 134 may select a lowest control target value of transmission power, and notify the secondary base station of the selected control target value.

[4-2. Second Interference Scenario]

In a second interference scenario, the interference control unit 134 determines the occurrence of adverse interference according to the above first technique. The first terminal is the primary terminal 20, and the first base station is the primary base station 10. Note that, in the second interference scenario, an interference factor is not the secondary base station 30, but rather the secondary terminal 40. A communication control process performed in the second interference scenario may be similar to that shown in FIG. 9.

Figure 10:
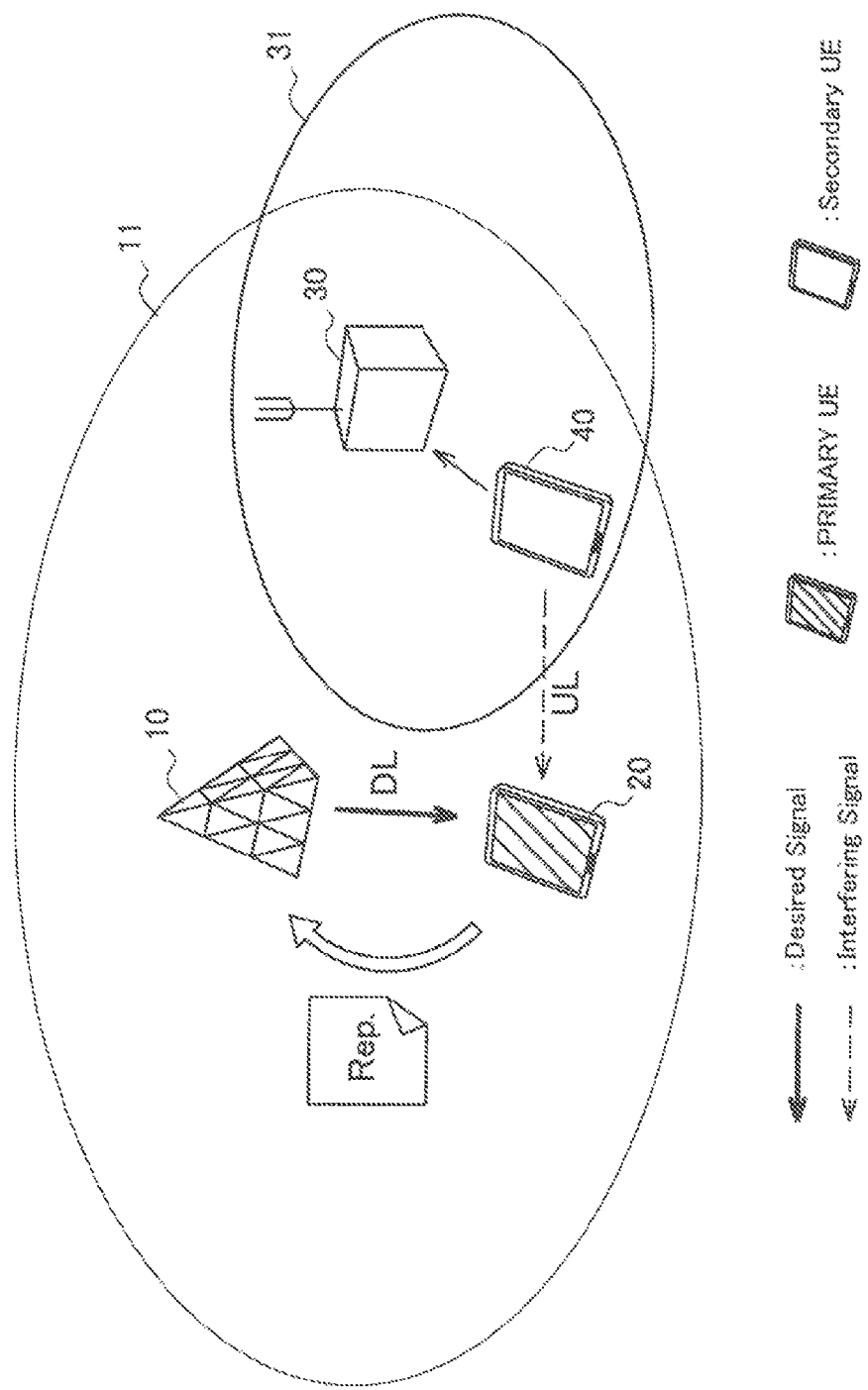
FIG. 10 is an explanatory diagram showing a relationship between a base station and a terminal in a second interference scenario.

FIG. 10 is an explanatory diagram showing a relationship between a base station and a terminal in the second interference scenario. In the second interference scenario, a downlink channel from the primary base station 10 to the primary terminal 20 is secondary used by the secondary base station 30. Also, an uplink signal from the secondary terminal 40 to the secondary base station 30 acts as an interfering signal on a desired signal received by the primary terminal 20.

One or more terminals connected to a base station each transmit an uplink signal with transmission power that allows the base station to receive equal received power of an uplink signal. This means that transmission power from a terminal is set to be greater as a path loss between the terminal and a base station increases. A relationship between the received power of a reference signal that is received by the secondary terminal 40 from the secondary base station 30, the transmission power of the reference signal, and a path loss between the secondary base station 30 and the secondary terminal 40, is represented by the following formula.

[Math 10]

$$P_{REF2\_2} = L_{2\_2} \cdot P_{REF2} \quad (2')$$

The transmission power $P_{UL2}$ of an uplink signal transmitted by the secondary terminal 40 is represented by the following formula, where $P_{REF2}$ is the transmission power of a reference signal, and $L_{2\_2}$ is a path loss.

[Math 11]

$$P_{UL2} = \frac{P_{BAS2}}{L_{2\_2}} = b_2 \cdot \frac{P_{REF2}}{L_{2\_2}} \quad (10)$$

In Formula (10), $P_{BAS2}$ represents base power on which transmission power from the secondary terminal 40 depends. The base power $P_{BAS2}$ may have a variable value that is signaled to the secondary terminal 40, or may have a predefined fixed value. Alternatively, instead of the base power $P_{BAS2}$, the ratio $b_2$ of the base power $P_{BAS2}$ to the transmission power $P_{REF2}$ of a reference signal may be signaled or fixedly defined.

Overall interference power $I_{UL2\_UE1}$ of uplink signals from $N_{UE2}$ secondary terminals 40 that is observed in the primary terminal 20, is represented by the following formula based on Formula (10). Note that $L_{2i\_1}$ represents a path loss between the i-th secondary terminal 40 and the primary terminal 20, and $L_{2\_2i}$ represents a path loss between the secondary base station 30 and the i-th secondary terminal 40.

[Math 12]

$$I_{UL2\_UE1} = P_{REF2} \cdot \sum_{i}^{N_{UE2}} \frac{L_{2i\_1}}{L_{2\_2i}} \quad (11)$$

According to a meaning similar to that of Formula (4), the $SINR_{REF1}$ of a reference signal from the primary base station 10 that is observed in the primary terminal 20 in the second interference scenario is represented by the following formula, where $M_{ALL2}$ is the total number of resource blocks in the secondary cell 31.

[Math 13]

$$SINR_{REF1} = \frac{P_{REF1\_1}}{N(d_1) + \frac{M_{REF1}}{M_{ALL2}} \cdot I_{UL2\_UE1}} \quad (12)$$

Here, the following relationship formula is derived from Formula (11) and Formula (12).

[Math 14]

$$\sum_{i}^{N_{UE2}} \frac{L_{2i\_1}}{L_{2\_2i}} = \frac{M_{ALL2}}{M_{REF1} \cdot P_{REF2}} \cdot \left\{ \frac{P_{REF1\_1}}{SINR_{REF1}} - N(d_1) \right\} \quad (13)$$

The instruction to the secondary base station 30 to reduce the transmission power of a reference signal in step S116 of FIG. 9 leads to a shrinkage of the secondary cell 31, and therefore, a decrease in the number $N_{UE2}$ of secondary terminals 40 located in the secondary cell 31. Specifically, when adverse interference is caused by an uplink signal transmitted to the secondary base station 30, the interference control unit 134 hands over one or more secondary terminals 40 from the secondary base station 30 to the primary base station 10. As a result, the overall interference power $I_{UL2\_UE1}$ of Formula (11) is reduced, and the communication quality $SINR_{REF1}$ of Formula (12) is improved.

As an example, if the transmission power $P_{REF2}$ of a reference signal of the secondary base station 30 is reduced to $P_{REF2}'$, the secondary terminal 40 that does not satisfy the following condition may perform handover to the primary base station 10. Note that $P_{TH1}$ is a threshold for determining handover. The threshold $P_{TH1}$ may vary depending on an operation mode (an active mode, an idle mode, etc.) of a terminal at that time.

[Math 15]

$$P_{TH1} < P_{REF2\_2i} = L_{2\_2i} \cdot P_{REF2}' \quad (14)$$

[4-3. Third Interference Scenario]

In a third interference scenario, the interference control unit 134 determines the occurrence of adverse interference according to the above first technique. The first terminal is the secondary terminal 40, and the first base station is the secondary base station 30. Specifically, the interference control unit 134 estimates a distance between the secondary terminal 40 and the secondary base station 30 to which the secondary terminal 40 is connected, from a received power indicator. Thereafter, the interference control unit 134 determines that adverse interference is present, if allowable quality depending on the estimated distance is not satisfied by a communication quality indicator contained in a quality report obtained from the secondary base station 30.

Figure 11:
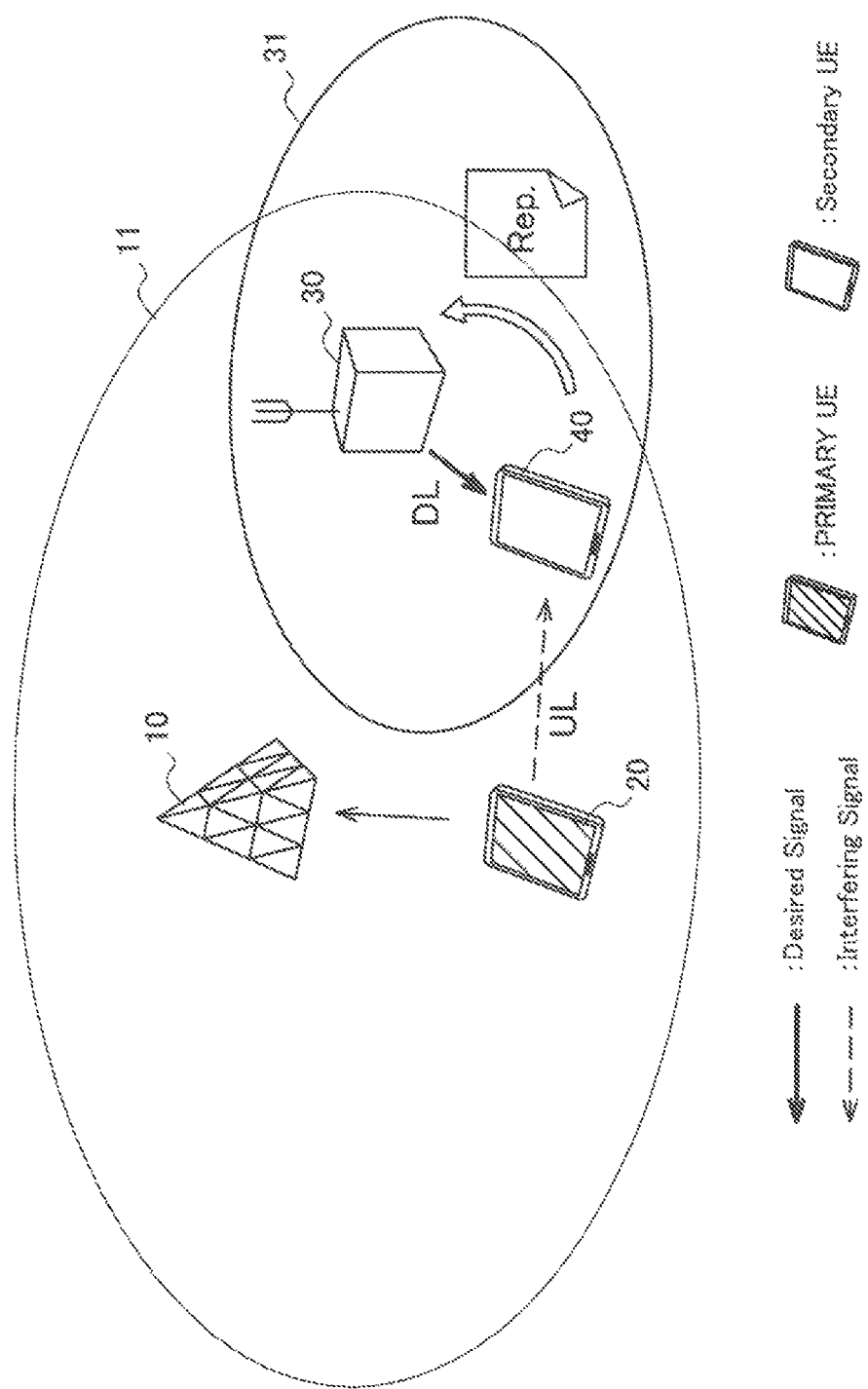
FIG. 11 is an explanatory diagram showing a relationship between a base station and a terminal in a third interference scenario.

FIG. 11 is an explanatory diagram showing a relationship between a base station and a terminal in the third interference scenario. In the third interference scenario, an uplink channel from the primary terminal 20 to the primary base station 10 is secondarily used by the secondary base station 30. The uplink signal from the primary terminal 20 to the primary base station 10 acts as an interfering signal on a desired signal received from the secondary terminal 40.

Overall interference power $I_{UL1\_UE2}$ of uplink signals from $N_{UE1}$ primary terminal 20 that is observed in the secondary terminal 40, is represented by the following formula, where $P_{UL1j}$ is the transmission power of the j-th primary terminal 20, and $L_{1i\_2}$ is a path loss between the j-th primary terminal 20 and the secondary terminal 40.

[Math 16]

$$I_{UL1\_UE2} = \sum_{j}^{N_{UE1}} L_{1i\_2} \cdot P_{UE1j} \quad (15)$$

An $SINR_{REF2}$ of a reference signal from the secondary base station 30 that is observed in the secondary terminal 40 in the third interference scenario, is represented by the following formula.

[Math 17]

$$SINR_{REF2} = \frac{P_{REF2\_2}}{N(d_2) + \frac{M_{REF2}}{M_{ALL1}} \cdot I_{UL1\_UE2}} \quad (16)$$

Note that $N(d_2)$ represents a noise component (thermal noise, and noise in a receiver) that depends on a distance $d_2$ from the secondary base station 30. When the CDMA scheme is employed, the noise component $N(d_2)$ is obtained through a correlation with codes assigned to a pilot signal. When the OFDMA scheme is employed, the noise component $N(d_2)$ may represent noise in the band of resource blocks allocated to a reference signal.

The instruction to the secondary base station 30 to reduce the transmission power of a reference signal in the third interference scenario leads to a shrinkage of the secondary cell 31, and therefore, a handover of the secondary terminal 40 whose measured communication quality does not satisfy allowable quality to the primary base station 10 (or such a secondary terminal 40 is connected to the primary base station 10 after selection of a cell or reselection of a cell). As a result, adverse interference that is present in the secondary terminal 40 may be eliminated.

As an example, if the transmission power $P_{REF2}$ of a reference signal of the secondary base station 30 is reduced to $P_{REF2}''$, the secondary terminal 40 that does not satisfy the following condition may perform handover to the primary base station 10. Note that $P_{TH2}$ is a threshold for determining handover. The threshold $P_{TH2}$ may vary depending on an operation mode of a terminal at that time.

[Math 18]

$$P_{TH2} < L_{2\_2i} \cdot (P_{REF}'' + P_{margin}) \quad (17)$$

Figure 12:
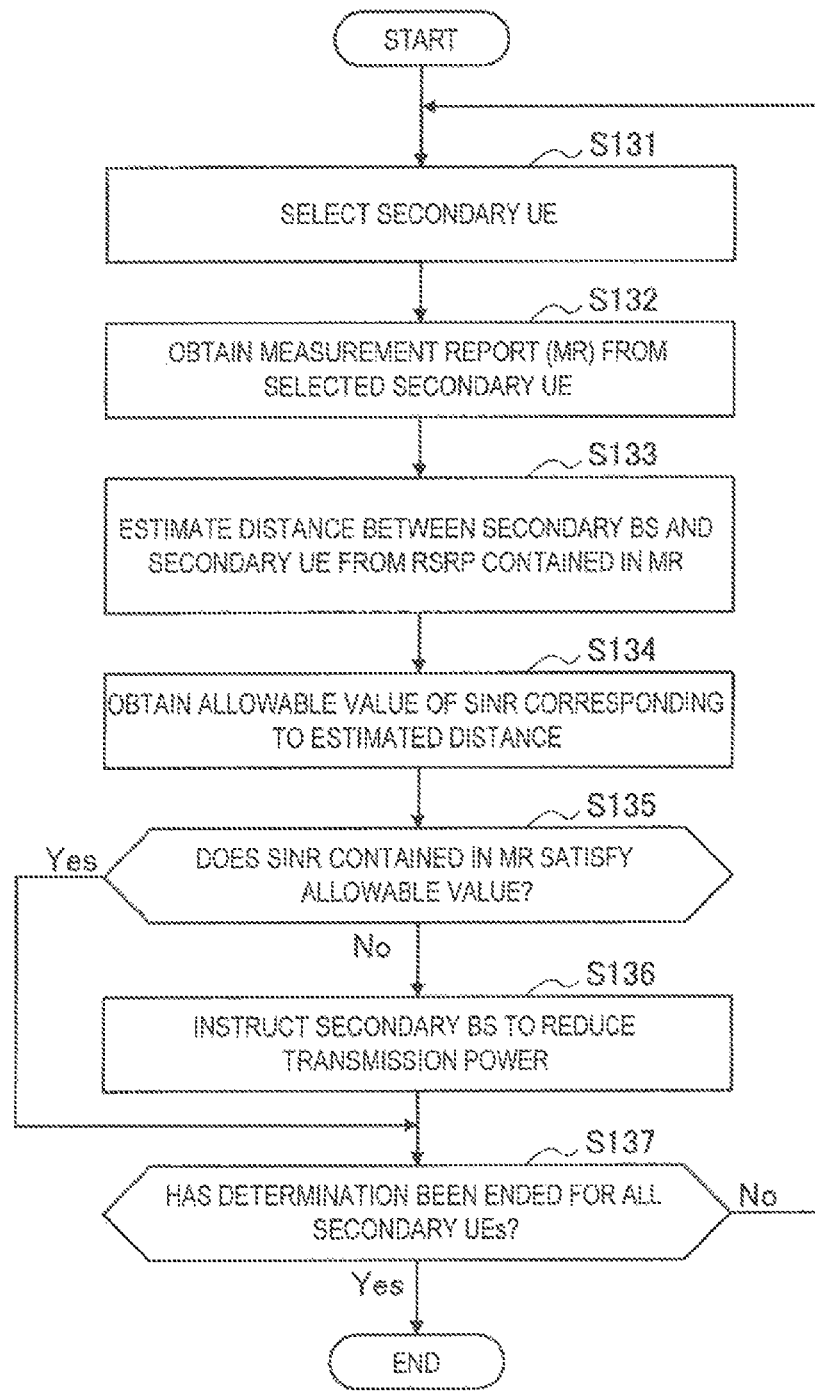
FIG. 12 is a flowchart showing an example flow of a communication control process that is performed by a cooperation manager in the third interference scenario.

FIG. 12 is a flowchart showing an example flow of a communication control process that is performed by the cooperation manager 100 in the third interference scenario. The communication control process described here may be repeatedly performed at regular or variable intervals, or may be performed according to a request from any terminal or base station.

Referring to FIG. 12, initially, the interference control unit 134 selects a secondary terminal (step S131). Next, the interference control unit 134 obtains a measurement report from the selected secondary terminal (step S132). Next, the interference control unit 134 estimates a distance between a secondary base station and a secondary terminal, from RSRP and the transmission power of a corresponding reference signal that are contained in the obtained measurement report (step S133). Next, the interference control unit 134 obtains an allowable value $SINR_{ALW2}$ of SINR corresponding to the estimated distance (step S134). Note that a table in which various distances are associated with corresponding allowable values of SINR, may be stored in the storage unit 120 in advance. Next, the interference control unit 134 determines whether or not an SINR contained in a measurement report from the selected secondary terminal satisfies allowable quality (i.e., whether or not the SINR exceeds the allowable value $SINR_{ALW2}$) (step S135). Here, if it is determined that the measured SINR does not satisfy allowable quality, the interference control unit 134 instructs a secondary base station to reduce transmission power (step S136). Such a process is repeated for each of secondary terminals (step S137). Thereafter, if the interference determination has been ended for all secondary terminals, the communication control process shown in FIG. 12 is ended.

Note that, instead of instructing a secondary base station to reduce transmission power after the interference determination has been performed for each secondary terminal as in the example of FIG. 12, a secondary base station may be instructed to reduce transmission power only once after the interference determination has been performed for all secondary terminals. In the latter case, the interference control unit 134 may select a lowest control target value of transmission power, and notify the secondary base station of the selected control target value.

[4-4. Fourth Interference Scenario]

In a fourth interference scenario, the interference control unit 134 determines the occurrence of adverse interference using location information of the primary base station 10 and the secondary base station 30. More specifically, the interference control unit 134 determines that adverse interference is present, if interference power that is calculated using the transmission power of a reference signal of the secondary base station 30, and a path loss estimated from the above location information, does not satisfy allowable interference power of the primary base station 10.

Figure 13:
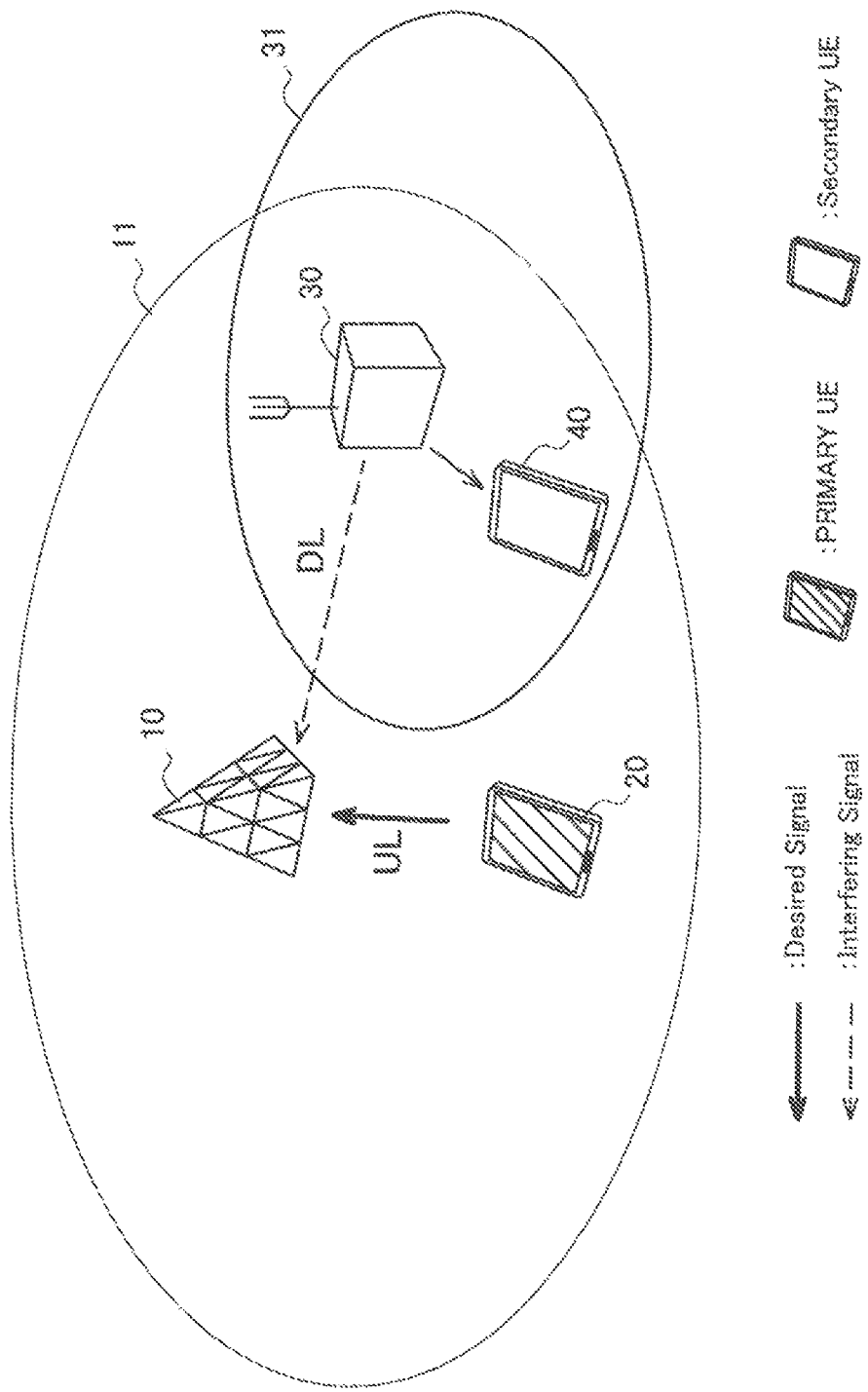
FIG. 13 is an explanatory diagram showing a relationship between a base station and a terminal in a fourth interference scenario.

FIG. 13 is an explanatory diagram showing a relationship between a base station and a terminal in the fourth interference scenario. In the fourth interference scenario, an uplink channel from the primary terminal 20 to the primary base station 10 is secondarily used by the secondary base station 30. Also, a downlink signal from the secondary base station 30 to the secondary terminal 40 acts as an interfering signal on a desired signal received by the primary base station 10.

When the secondary base station 30 is a stationary device, location information of the secondary base station 30 may be stored in the storage unit 120 in advance, and may be obtained by the data obtaining unit 132. When the secondary base station 30 is a mobile device, the secondary base station 30 may measure a location of the secondary base station 30, and the data obtaining unit 132 may obtain location information indicating the measured location. The location information may indicate an absolute topographical location, such as a latitude, longitude, and altitude, or the like, or a relative location (or a relative distance) from any reference location, such as a location of a specific primary base station.

Figure 14:
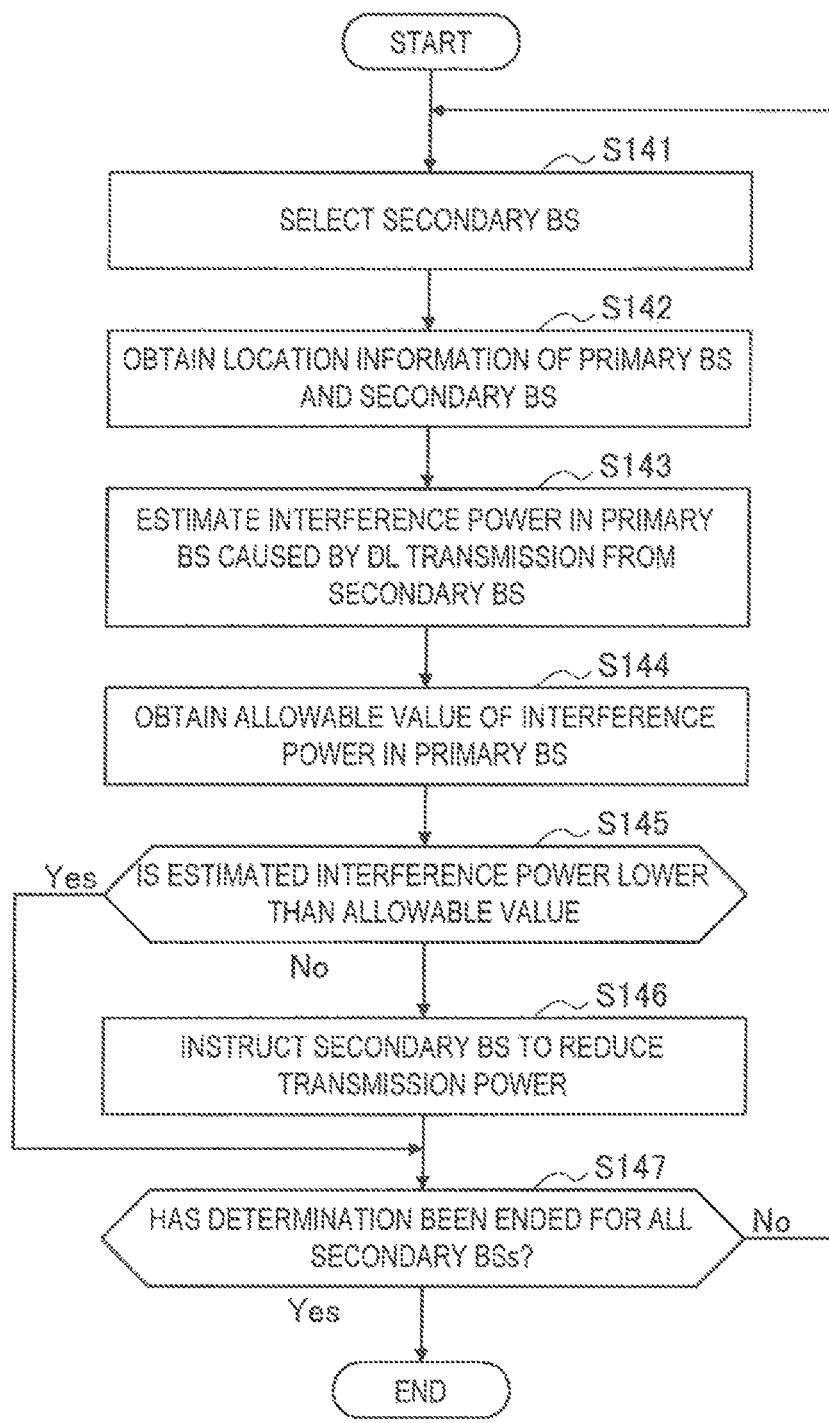
FIG. 14 is a flowchart showing an example flow of a communication control process that is performed by a cooperation manager in the fourth interference scenario.

FIG. 14 is a flowchart showing an example flow of a communication control process that is performed by the cooperation manager 100 in the fourth interference scenario. The communication control process described here may be repeatedly performed at regular or variable intervals, or may be performed according to a request from any terminal or base station.

Referring to FIG. 14, initially, the interference control unit 134 selects a secondary base station (step S141). Next, the interference control unit 134 obtains the location information of a primary base station and the selected secondary base station (step S142). Next, the interference control unit 134 uses the obtained location information to estimate interference power in the primary base station that is caused by downlink transmission from the selected secondary base station (step S43). Next, the interference control unit 134 obtains the allowable value of interference power in the primary base station (step S144). Note that the allowable value of interference power of each primary base station may be stored in the storage unit 120 in advance. The allowable value of interference power of a primary base station may be a value obtained by multiplying a minimum reception sensitivity by a certain coefficient. Next, the interference control unit 134 determines whether or not the estimated interference power is lower than the allowable value (step S145). Here, if the interference control unit 134 determines that the interference power is not lower than the allowable value, the interference control unit 134 instructs the secondary base station to reduce transmission power (step S146). Such a process is repeated for each secondary base station located in the primary cell (step S147). Thereafter, if the interference determination has been ended for all secondary base stations, the communication control process shown in FIG. 14 is ended.

Note that when interference power estimated for a certain secondary base station is much lower than the allowable value, the interference control unit 134 may instruct that secondary base station to increase transmission power.

[4-5. Fifth Interference Scenario]

In a fifth interference scenario, the interference control unit 134 determines the occurrence of adverse interference according to the above second technique. The second terminal is the primary terminal 20, and the second base station is the secondary base station 30. Specifically, the interference control unit 134 estimates a path loss between the primary terminal 20 and the secondary base station 30 to which the primary terminal 20 is not connected, from an interference component of a communication quality indicator contained in a quality report obtained from the primary terminal 20. Also, the interference control unit 134 estimates interference power in the secondary base station 30 that is caused by the transmission power of the primary terminal 20, based on the estimated path loss. Thereafter, if the estimated interference power does not satisfy allowable interference power, the interference control unit 134 determines that adverse interference is present.

Figure 15:
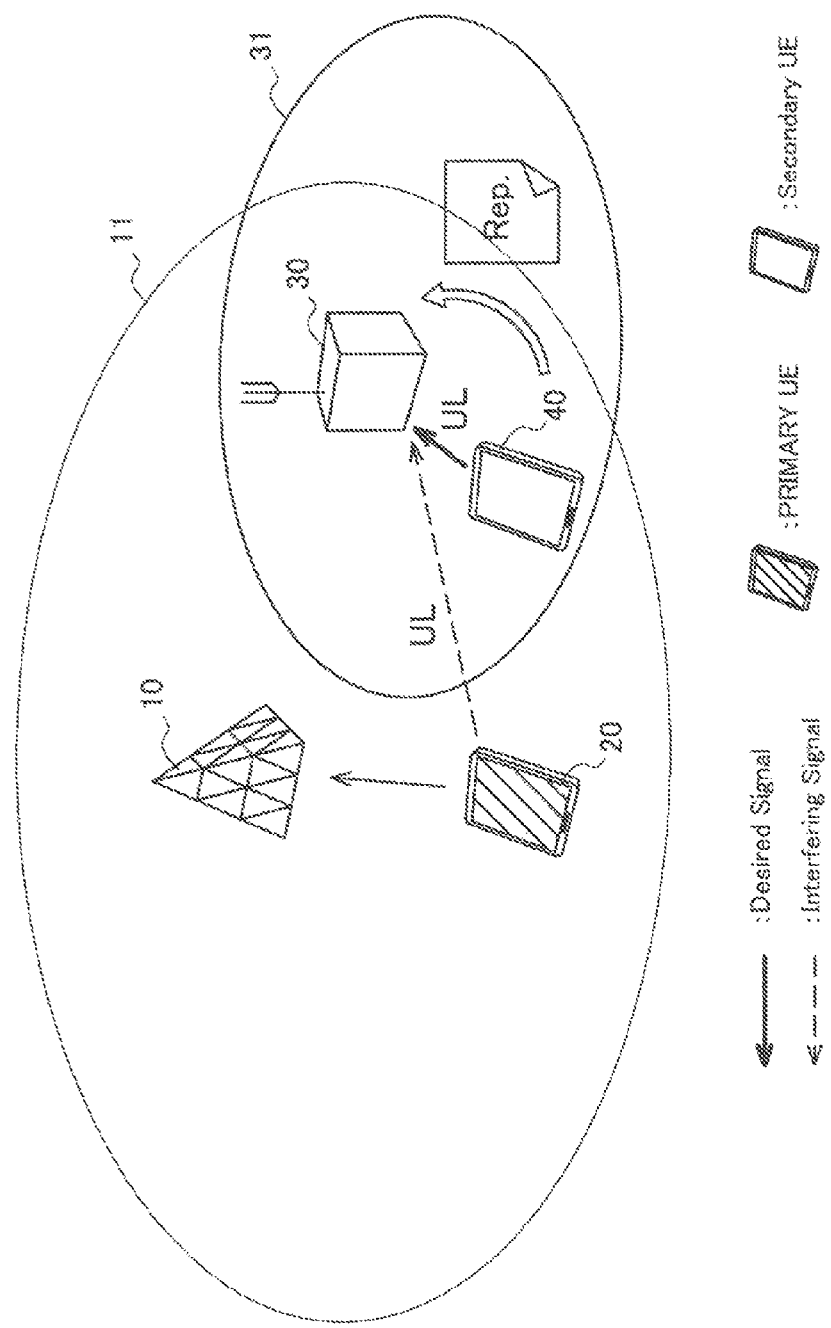
FIG. 15 is an explanatory diagram showing a relationship between a base station and a terminal in a fifth interference scenario.

FIG. 15 is an explanatory diagram showing a relationship between a base station and a terminal in the fifth interference scenario. In the fifth interference scenario, an uplink channel from the primary terminal 20 to the primary base station 10 is secondarily used by the secondary base station 30. Also, an uplink signal from the primary terminal 20 to the primary base station 10 acts as an interfering signal on a desired signal received by the secondary base station 30.

The fifth interference scenario is further divided into two sub-scenarios. In a first sub-scenario, the secondary base station 30 secondarily uses not only an uplink channel of the primary cell 11, but also a downlink channel of the primary cell 11. In this case, a reference signal transmitted from the secondary base station 30 is received as an interfering signal by the primary terminal 20, and therefore, the use of the above second technique is advantageous. On the other hand, in a second sub-scenario, a downlink channel of the primary cell 11 is not secondary used. Interference determination in the second sub-scenario will be described below.

In the first sub-scenario, the interference power $I_{DL2\_UE1}$ of a reference signal from the secondary base station 30, that is observed by the primary terminal 20, is represented by the following formula.

[Math 19]

$$I_{DL2\_UE1} = \frac{M_{ALL1}}{M_{ALL2}} \cdot L_{BS2\_UE1} \cdot P_{REF2} \qquad (18)$$

Here, $L_{BS2\_UE1}$ in Formula (18) is an unknown path loss from the secondary base station 30 to the primary terminal 20. If the interference power $I_{REF2\_UE1}$ of Formula (18) is an interference component of an SINR contained in a quality report obtained from the primary terminal 20, the unknown path loss $L_{BS2\_UE1}$ can be derived by substituting the interference component into Formula (18). Note that a path loss $L_{UE1\_BS2}$ from the primary terminal 20 to the secondary base station 30 (specifically, in the opposite direction), may be obtained by converting the path loss $L_{BS2\_UE1}$, taking into consideration that a frequency $f_{DL1}$ of a downlink channel and a frequency $f_{UL1}$ of an uplink channel, of the primary cell 11, are different from each other.

[Math 20]

$$L_{UE1\_BS2} = \left(\frac{f_{DL1}}{f_{UL1}}\right)^2 \cdot L_{BS2\_UE1} \qquad (19)$$

Interference power $L_{UL1\_BS2}$ of an uplink signal from the primary terminal 20, that is observed in the secondary base station 30, is represented by the following formula.

[Math 21]

$$I_{UL1\_BS2} = L_{UE1\_BS2} \cdot P_{UL1} = L_{UE1\_BS2} \cdot \frac{P_{BAS1}}{L_{1\_1}} \qquad (20)$$

In Formula (20), $P_{BAS1}$ represents base power on which transmission power from the primary terminal 20 depends. The interference control unit 134 estimates, in this manner, interference power in the secondary base station 30 that is caused by the transmission power of the primary terminal 20. Thereafter, if the greatest value of the interference power estimated for all primary terminals 20 does not satisfy the allowable interference power of the secondary base station 30, the interference control unit 134 determines that adverse interference is present. If an estimated SINR calculated from the estimated interference power does not satisfy the allowable quality of the secondary base station 30, the interference control unit 134 may determine that adverse interference is present.

Figure 16:
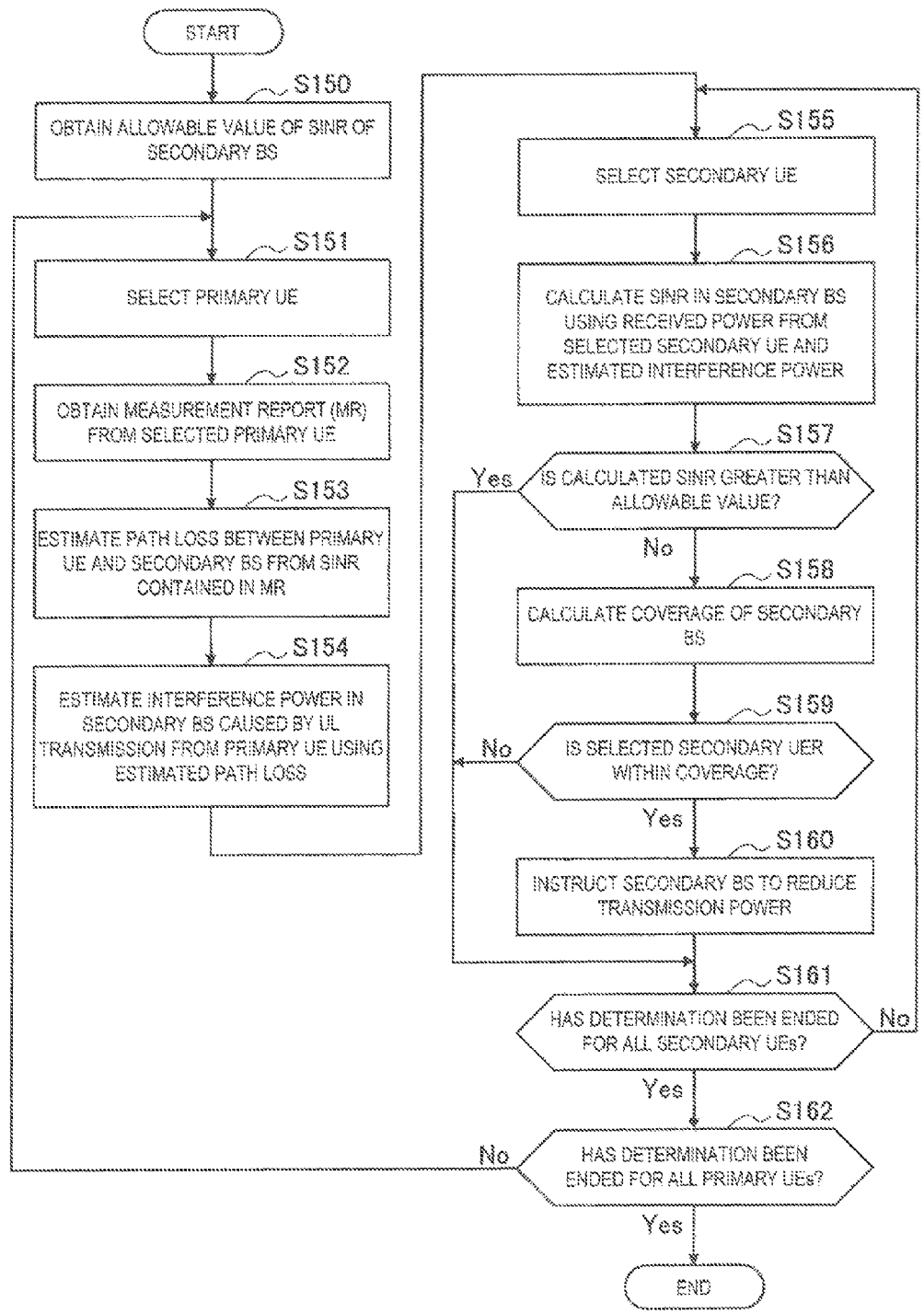
FIG. 16 is a flowchart showing an example flow of a communication control process that is performed by a cooperation manager in the fifth interference scenario.

FIG. 16 is a flowchart showing an example flow of a communication control process that is performed by the cooperation manager 100 in the fifth interference scenario. The communication control process described here may be repeatedly performed at regular or variable intervals, or may be performed according to a request from any terminal or base station.

Referring to FIG. 16, initially, the interference control unit 134 obtains an allowable value of SINR of a secondary base station (step S50). Next, the interference control unit 134 selects one primary terminal (step S151). Next, the interference control unit 134 obtains a measurement report from the selected primary terminal (step S152). Next, the interference control unit 134 estimates a path loss between the primary terminal and the secondary base station, from an SINR contained in the obtained measurement report (step S153). Next, the interference control unit 134 uses die estimated path loss to estimate interference power in the secondary base station that is caused by uplink transmission from the primary terminal (step S154).

Next, the interference control unit 134 selects one secondary terminal (step S55). Next, the interference control unit 134 uses received power from the selected secondary terminal and the interference power estimated in step S154 to calculate an SINR in the secondary base station (step S156). Next, the interference control unit 134 determines whether or not the SINR calculated in step S156 exceeds the allowable value obtained in step S150 (step S157). Here, if the interference control unit 134 determines that the calculated SINR does not exceed the allowable value, the interference control unit 134 calculates the coverage of the secondary cell based on the transmission power of a reference signal of the secondary base station (step S158). Next, the interference control unit 134 determines whether or not the selected secondary terminal is located within the coverage of the secondary cell (step S159). Thereafter, if the interference control unit 134 determines that the selected secondary terminal is located within the coverage of the secondary cell, the interference control unit 134 instructs the secondary base station to reduce transmission power (step S160).

Such a process is repeated for each pair of a secondary terminal and a primary terminal (steps S161 and S162). Thereafter, when the interference determination has been ended for all pairs, the communication control process shown in FIG. 16 is ended.

Note that, instead of instructing a secondary base station to reduce transmission power after the interference determination has been performed for each pair of a secondary terminal and a primary terminal as in the example of FIG. 16, a secondary base station may be instructed to reduce transmission power only once after the interference determination has been performed for all pairs.

In the second sub-scenario, the primary base station 10 and the primary terminal 20 operate according to the FDD scheme, and the secondary base station 30 and the secondary terminal 40 secondarily use only uplink channels of the primary base station 10. In this case, when the primary terminal 20 performs measurement, the secondary base station 30 does not transmit a reference signal. Therefore, it is difficult to estimate a path loss between the primary terminal 20 and the secondary base station 30, from an interference component of a communication quality indicator measured by the primary terminal 20. Therefore, the interference control unit 134 assumes a worst case where the primary terminal 20 is located at a cell edge of the secondary cell 31. Thereafter, on this assumption, the interference control unit 134 estimates interference power in the secondary base station 30 that is caused by the transmission power of the primary terminal 20, and determines whether or not the estimated interference power satisfies allowable interference power.

Figure 17:
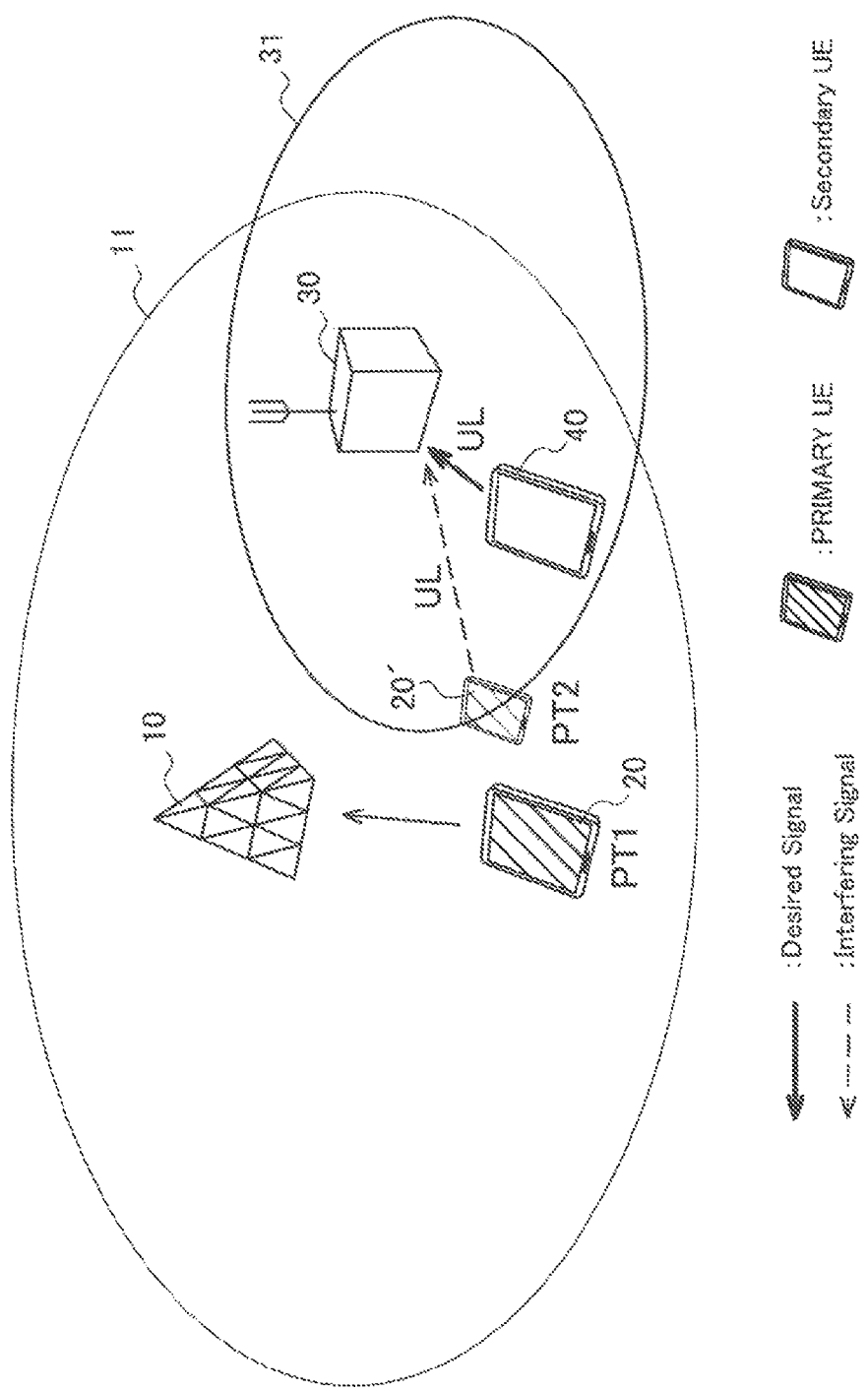
FIG. 17 is an explanatory diagram for explaining one variation of the communication control process performed in the fifth interference scenario.

FIG. 17 is an explanatory diagram for explaining one variation of the communication control process performed in the fifth interference scenario. In the second sub-scenario of the fifth interference scenario, it is assumed that the primary terminal 20 is not present at an actual location PT1, but rather at a location PT2 on a cell edge of the secondary cell 31.

Here, there is the following relationship between a path loss $L_{UE1\_BS1}$ from the primary terminal 20 to the primary base station 10 and a path loss $L_{BS1\_UE1}$ from the primary base station 10 to the primary terminal 20.

[Math 22]

$$L_{UE1\_BS1} = \left(\frac{f_{DL1}}{f_{UL1}}\right)^2 \cdot L_{BS1\_UE1} \quad (21)$$

Also, there is the following relationship between a path loss $L_{UE1'\_BS2}$ from a virtual primary terminal 20' to the secondary base station 30 and a path loss $L_{BS2\_UE1'}$ from the secondary base station 30 to the virtual the primary terminal 20'.

[Math 23]

$$L_{UE1'\_BS2} = \left(\frac{f_{DL1}}{f_{UL1}}\right)^2 \cdot L_{BS2\_UE1'} \quad (22)$$

From Formula (21) and Formula (22), interference power $L_{UL1\_BS2}$ in the secondary base station 30 that is caused by uplink transmission from the primary terminal 20' can be represented by the following formula.

[Math 24]

$$I_{UL1\_BS2} = L_{UE1'\_BS2} \cdot P_{UL1} = L_{UE1'\_BS2} \cdot \frac{P_{BAS1}}{L_{1\_1'}} \quad (23)$$

Received power $L_{UL2\_BS2}$ of a desired signal received by the secondary base station 30 is represented by the following formula.

[Math 25]

$$P_{UL2\_BS2} = L_{UE2\_BS2} \cdot P_{UL2} \quad (24)$$

$$L_{UE2\_BS2} = \left(\frac{f_{DL1}}{f_{UL1}}\right)^2 \cdot L_{2\_2} \quad (25)$$

The interference control unit 134 can calculate an SINR or SIR in the secondary base station 30 using the interference power $I_{UL1\_BS2}$ of Formula (23) and the received power $L_{UL2\_BS2}$ of Formula (24). Thereafter, the interference control unit 134 may compare the calculated SINR or SIR with an allowable value to determine whether or not adverse interference is present, and if determining that adverse interference is present, may instruct the secondary base station 30 to reduce transmission power.

[4-6. Sixth Interference Scenario]

In a sixth interference scenario, the interference control unit 134 determines the occurrence of adverse interference according to the above second technique. The second terminal is the secondary terminal 40, and the second base station is the primary base station 10. Specifically, the interference control unit 134 estimates a path loss between the secondary terminal 40 and the primary base station 10 to which the secondary terminal 40 is not connected, from an interference component of a communication quality indicator contained in a quality report obtained from the secondary terminal 40. Also, the interference control unit 134 estimates interference power in the primary base station 10 that is caused by the transmission power of the secondary terminal 40, based on the estimated path loss. Thereafter, if the estimated interference power does not satisfy allowable interference power, the interference control unit 134 determines that adverse interference is present.

Figure 18:
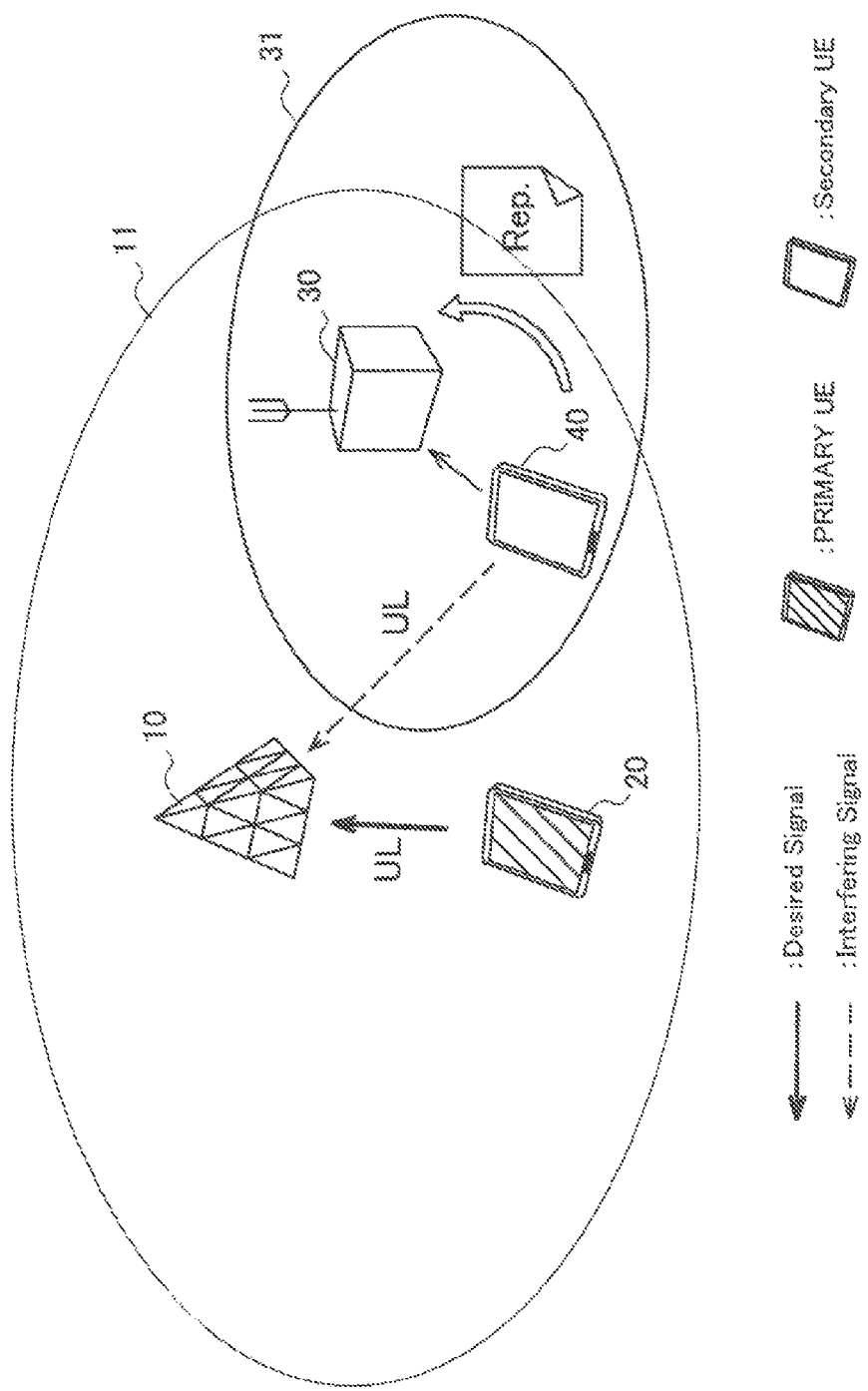
FIG. 18 is an explanatory diagram showing a relationship between a base station and a terminal in a sixth interference scenario.

FIG. 18 is an explanatory diagram showing a relationship between a base station and a terminal in the sixth interference scenario. In the sixth interference scenario, an uplink channel from the primary terminal 20 to the primary base station 10 is secondarily used by the secondary base station 30. Also, an uplink signal from the secondary terminal 40 to the secondary base station 30 acts as an interfering signal on a desired signal received by the primary base station 10.

The sixth interference scenario is further divided into two sub-scenarios. In a first sub-scenario, the secondary base station 30 secondarily uses not only an uplink channel of the primary cell 11, but also a downlink channel of the primary cell 11. In this case, a reference signal transmitted from the primary base station 10 is received as an interfering signal by the secondary terminal 40, and therefore, the use of the above second technique is advantageous. On the other hand, in a second sub-scenario, a downlink channel of the primary cell 11 is not secondary used. Interference determination in the second sub-scenario will be described below.

In the first sub-scenario, the transmission power $P_{DL1}$ of a downlink transmitted from the primary base station 10 is represented by the following formula.

[Math 26]

$$P_{DL1} = \frac{M_{ALL1}}{M_{REF1}} \cdot P_{REF1} \quad (26)$$

Interference power $L_{DL1\_UE2}$ of a downlink signal from the primary base station 10, that is observed in the secondary terminal 40, is represented by the following formula. Note that $L_{BS1\_UE2}$ represents a path loss from the primary base station 10 to the secondary terminal 40.

[Math 27]

$$I_{DL1\_UE2} = L_{BS1\_UE2} \cdot P_{DL1} \quad (27)$$

An $SINR_{REF2}$ of a reference signal from the secondary base station 30 that is observed in the secondary terminal 40 is represented by the following formula.

[Math 28]

$$SINR_{REF2} = \frac{P_{REF2\_2}}{N(d_2) + \frac{M_{REF2}}{M_{ALL2}} \cdot I_{DL1\_UE2}} \quad (28)$$

Here, $L_{BS1\_UE2}$ in Formula (27) is an unknown path loss from the primary base station 10 to the secondary terminal 40. If the interference power $L_{DL1\_UE2}$ of Formula (27) is an interference component of an SINR contained in a quality report obtained from the secondary terminal 40, the unknown path loss $L_{BS1\_UE2}$ can be derived by substituting the interference component into Formula (27). Note that a path loss $L_{UE2\_BS1}$ from the secondary terminal 40 to the primary base station 10 (specifically, in the opposite direction), may be obtained by converting the path loss $L_{BS1\_UE2}$, taking into consideration that a frequency $f_{DL1}$ of a downlink channel and a frequency $f_{UL1}$ of an uplink channel, of the primary cell 11, are different from each other.

[Math 29]

$$L_{UE2\_BS1} = \left(\frac{f_{UL1}}{f_{DL1}}\right)^2 \cdot L_{BS1\_UE2} \quad (29)$$

Interference power $L_{UL2\_BS1}$ of an uplink signal from the secondary terminal 40, that is observed in the primary base station 10, is represented by the following formula.

[Math 30]

$$I_{UL2\_BS1} = L_{UE2\_BS1} \cdot P_{UL2} = L_{UE2\_BS1} \cdot \frac{P_{BAS2}}{L_{2\_2}} \quad (30)$$

In Formula (30), $P_{BAS2}$ represents base power on which transmission power from the secondary terminal 40 depends. The interference control unit 134 estimates, in this manner, interference power in the primary base station 10 that is caused by the transmission power of the secondary terminal 40. Thereafter, if the greatest value of the interference power estimated for all secondary terminals 40 does not satisfy the allowable interference power of the primary base station 10, the interference control unit 134 determines that adverse interference is present. If an estimated SINR calculated from the estimated interference power does not satisfy the allowable quality of the primary base station 10, the interference control unit 134 may determine that adverse interference is present.

Figure 19:
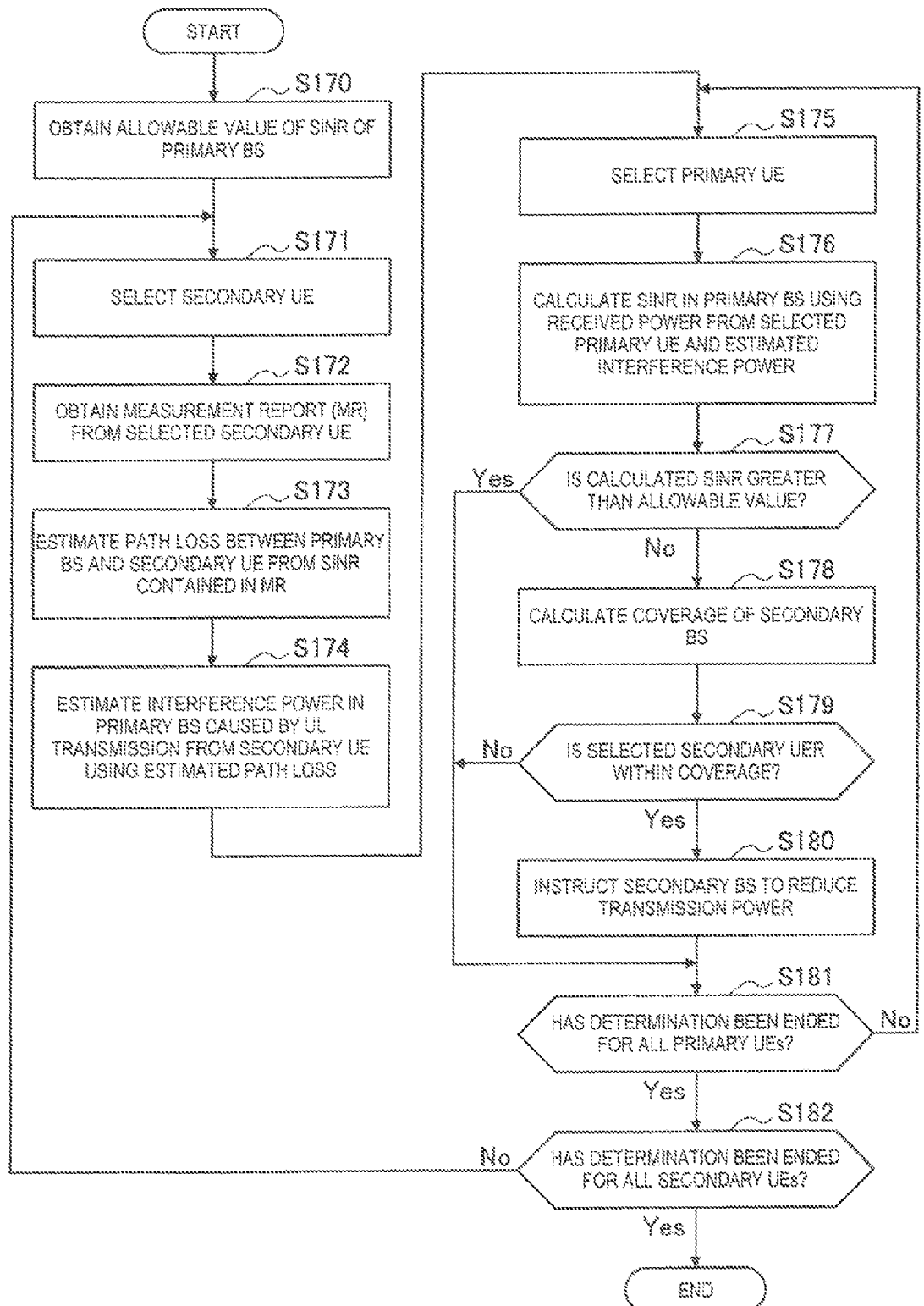
FIG. 19 is a flowchart showing an example flow of a communication control process that is performed by a cooperation manager in the sixth interference scenario.

FIG. 19 is a flowchart showing an example flow of a communication control process that is performed by the cooperation manager 100 in the sixth interference scenario. The communication control process described here may be repeatedly performed at regular or variable intervals, or may be performed according to a request from any terminal or base station.

Referring to FIG. 19, initially, the interference control unit 134 obtains an allowable value of SINR of a primary base station (step S170). Next, the interference control unit 134 selects one secondary terminal (step S171). Next, the interference control unit 134 obtains a measurement report from the selected secondary terminal (step S172). Next, the interference control unit 134 estimates a path loss between the secondary terminal and the primary base station, from an SINR contained in the obtained measurement report (step S173). Next, the interference control unit 134 uses the estimated path loss to estimate interference power in the primary base station that is caused by uplink transmission from the secondary terminal (step S174).

Next, the interference control unit 134 selects one primary terminal (step S175). Next, the interference control unit 134 uses received power from the selected primary terminal and the interference power estimated in step S174 to calculate an SINR in the primary base station (step S176). Next, the interference control unit 134 determines whether or not the SINR calculated in step S176 exceeds the allowable value obtained in step S170 (step S177). Here, if the interference control unit 134 determines that the calculated SINR does not exceed the allowable value, the interference control unit 134 calculates the coverage of the secondary cell based on the transmission power of a reference signal of the secondary base station (step S178). Next, the interference control unit 134 determines whether or not the selected secondary terminal is located within the coverage of the secondary cell (step S179). Thereafter, if the interference control unit 134 determines that the selected secondary terminal is located within the coverage of the secondary cell, the interference control unit 134 instructs the secondary base station to reduce transmission power (step S180).

Such a process is repeated for each pair of a primary terminal and a secondary terminal (steps S181 and S182). Thereafter, when the interference determination has been ended for all pairs, the communication control process shown in FIG. 19 is ended.

Note that, instead of instructing a secondary base station to reduce transmission power after the interference determination has been performed for each pair of a primary terminal and a secondary terminal as in the example of FIG. 19, a secondary base station may be instructed to reduce transmission power only once after the interference determination has been performed for all pairs.

In the second sub-scenario, the primary base station 10 and the primary terminal 20 operate according to the FDD scheme, and the secondary base station 30 and the secondary terminal 40 secondarily use only uplink channels of the primary base station 10. In this case, when the secondary terminal 40 performs measurement, the primary base station 10 does not transmit a reference signal. Therefore, it is difficult to estimate a path loss between the secondary terminal 40 and the primary base station 10, from on an interference component of a communication quality indicator measured by the secondary terminal 40. Therefore, the interference control unit 134 assumes a worst case where the secondary terminal 40 is located at a cell edge closest to the primary base station 10 in the secondary cell 31. Thereafter, on this assumption, the interference control unit 134 estimates interference power in the primary base station 10 that is caused by the transmission power of the secondary terminal 40, and determines whether or not the estimated interference power satisfies allowable interference power.

Figure 20:
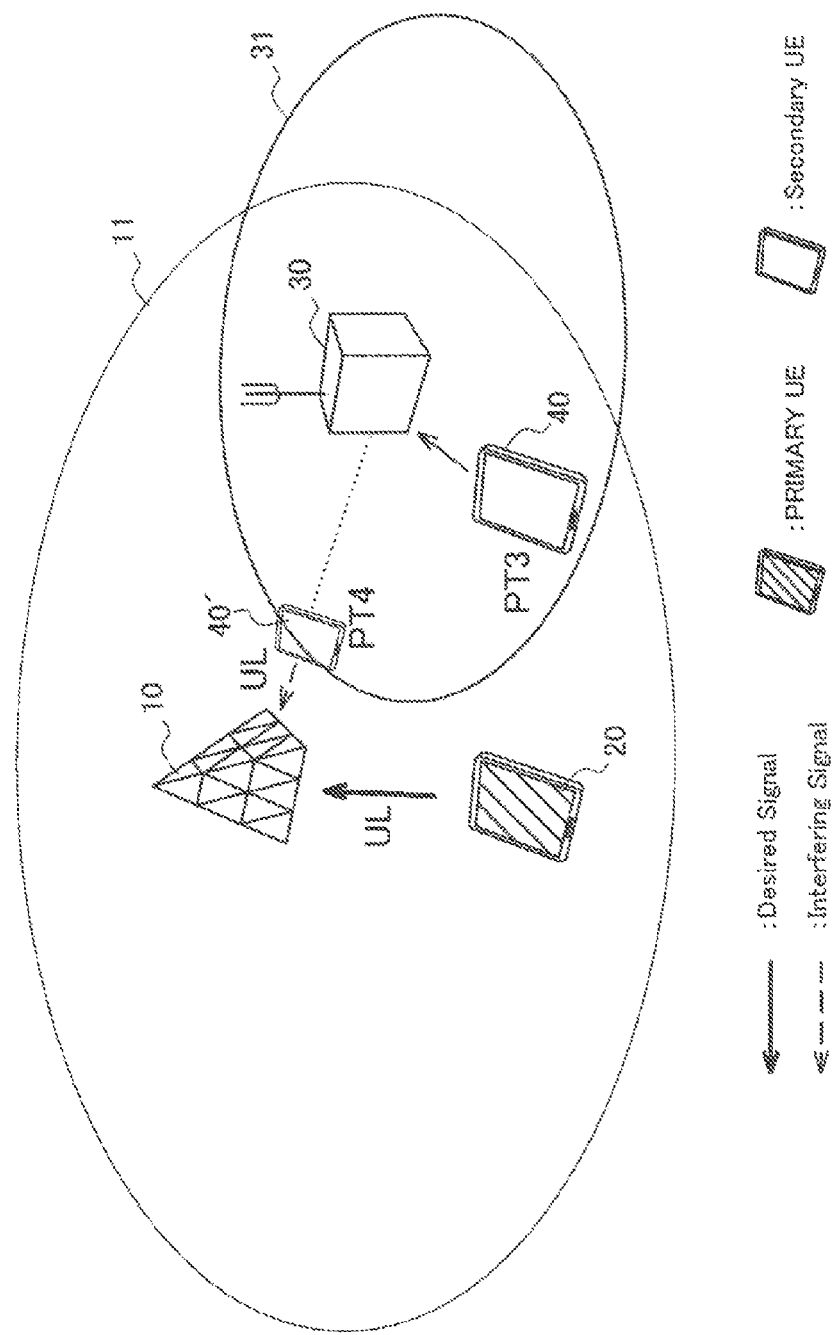
FIG. 20 is an explanatory diagram for explaining one variation of the communication control process performed in the sixth interference scenario.

FIG. 20 is an explanatory diagram for explaining one variation of the communication control process performed in the sixth interference scenario. In the second sub-scenario of the sixth interference scenario, it is assumed that the secondary terminal 40 is not present at an actual location PT3, but rather at a location PT4 on a cell edge of the secondary cell 31.

Interference power $L_{UL2\_BS1}$ in the primary base station 10 that is caused by uplink transmission from the secondary terminal 40', is represented by the following formula.

[Math 31]

$$I_{UL2\_BS1} = L_{UE2'\_BS1} \cdot P_{UL2} = L_{UE2'\_BS1} \cdot \frac{P_{BAS2}}{L_{2\_2'}} \quad (31)$$

A distance between the primary base station 10 and the secondary base station 30 is calculated from location information. Also, a distance between the secondary base station 30 and the secondary terminal 40' is calculated as a radius of the secondary cell 31 from the transmission power of a reference signal from the secondary base station 30. Therefore, by substituting the values of path losses corresponding to these distances into Formula (31), the interference power $L_{UL2\_BS1}$ can be estimated. The interference control unit 134 can use the interference power $L_{UL2\_BS1}$ thus estimated to calculate an SINR or SIR in the primary base station 10. Thereafter, the interference control unit 134 may compare the calculated SINR or SIR with an allowable value to determine whether or not adverse interference is present, and if determining that adverse interference is present, may instruct the secondary base station 30 to reduce transmission power.

5. Conclusion

In the foregoing, embodiments of the technology according to the present disclosure have been described with reference to FIGS. 1-20. According to the above embodiments, in an environment where a frequency channel for a primary base station is secondarily used by a secondary base station, it is determined whether or not adverse interference is present, based on a communication quality indicator contained in a quality report generated by a primary terminal or a secondary terminal. Thereafter, if it is determined that adverse interference is present, the secondary base station is instructed to reduce transmission power. As a result, adverse interference can be prevented and the secondary use of a frequency channel can be safely performed, without the need of an arrangement for sensing a communication state. Here, a quality report may be a measurement report or a CQI report. Therefore, the determination of adverse interference can be assisted by slightly modifying a reporting function possessed by an existing terminal.

According to a certain technique, a quality report contains a received power indicator for a reference signal. Also, a distance between a first terminal and a first base station to which the first terminal is connected is estimated from the received power indicator, and the occurrence of interference is determined based on comparison between allowable quality depending on the estimated distance and the above communication quality indicator. Therefore, adverse interference experienced by a primary terminal or a secondary terminal, or the risk thereof, can be accurately determined using the above quality report, irrespective of the location of the terminal in a cell.

According to another technique, a path loss between a second terminal and a second base station to which the second terminal is not connected is estimated from an interference component of a communication quality indicator. Thereafter, based on the estimated path loss, interference power in the second base station that is caused by the transmission power of the second terminal is estimated, and based on the estimated interference power, the occurrence of interference is determined. Therefore, adverse interference experienced by a primary base station or a secondary base station, or the risk thereof, can be determined using the above quality report.

Further, a series of control processes by the respective devices described in the present description may be implemented using any one of software, hardware, and a combination of hardware and software. For example, a program configuring software is stored in a storage medium (a non-transitory medium) installed inside or outside each device. Further, for example, each program is read onto a Random Access Memory (RAM) at the time of execution and executed by a processor such as a Central Processing Unit (CPU). The technology according to the present disclosure may be implemented as a one-chip module in which a processor that executes such a program, a memory that stores the program, and related circuits are integrated together.

Further, the processes described using the flowcharts in the present description may not necessarily be executed in the order indicated by the flowchart. Some process steps may be executed in parallel. Further, additional process steps may be employed, and some process steps may be omitted.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

A communication control device including:

an obtaining unit configured to, in a radio communication system including a primary base station to which a primary terminal is connected, and a secondary base station to which a secondary terminal is connected by secondarily using a frequency channel for the primary base station, obtain at least one of a quality report containing a communication quality indicator measured by the primary terminal and a quality report containing a communication quality indicator measured by the secondary terminal; and an interference control unit configured to instruct the secondary base station to reduce transmission power, when it is determined that adverse interference is present in the radio communication system, based on the communication quality indicator contained in the quality report obtained by the obtaining unit.

(2)

The communication control device according to (1), wherein the quality report is a measurement report or a channel quality indicator (CQI) report.

(3)

The communication control device according to (1) or (2), wherein the quality report contains a received power indicator for a reference signal, wherein the interference control unit estimates a distance between a first terminal and a first base station to which the first terminal is connected, from the received power indicator, and determines that the adverse interference is present, if the communication quality indicator does not satisfy allowable quality depending on the estimated distance.

(4)

The communication control device according to (1) or (2), wherein the interference control unit estimates a path loss between a second terminal and a second base station to which the second terminal is not connected, from an interference component of the communication quality indicator, estimates interference power in the second base station caused by transmission power of the second terminal, based on the estimated path loss, and determines that the adverse interference is present, if the estimated interference power does not satisfy allowable interference power.

(5)

The communication control device according to (3), wherein the first terminal is the primary terminal, and wherein the first base station is the primary base station.

(6)

The communication control device according to (5), wherein the interference control unit assumes that an interference component of the communication quality indicator contained in the quality report of the primary terminal is caused by the transmission power of the secondary base station, and calculates a control target value of the transmission power of the secondary base station.

(7)

The communication control device according to (6), wherein the secondary terminal and the secondary base station operate according to a time division duplex scheme, and wherein the interference control unit changes the control target value, depending on a ratio of uplink slots and downlink slots of the secondary base station.

(8)

The communication control device according to (6) or (7), wherein, when the adverse interference is caused by an uplink signal transmitted to the secondary base station, the interference control unit hands over one or more secondary terminals from the secondary base station to the primary base station to reduce the adverse interference.

(9)

The communication control device according to (3), wherein the first terminal is the secondary terminal, and wherein the first base station is the secondary base station.

(10)

The communication control device according to any one of (1) to (9), wherein the obtaining unit further obtains location information of the primary base station and the secondary base station, and wherein, when interference power calculated using transmission power of a reference signal of the secondary base station and a path loss estimated from the location information does not satisfy allowable interference power of the primary base station, the interference control unit determines that the adverse interference is present.

(11)

The communication control device according to (4), wherein the second terminal is the primary terminal, and wherein the second base station is the secondary base station.

(12)

The communication control device according to any one of (1) to (10), wherein the primary terminal and the primary base station operate according to a frequency division duplex scheme, wherein the secondary terminal and the secondary base station secondarily use an uplink channel of the primary base station, and wherein, when interference power in the secondary base station caused by transmission power of the primary terminal does not satisfy allowable interference power on an assumption that the primary terminal is located at a cell edge of the secondary base station, the interference control unit determines that the adverse interference is present.

(13)

The communication control device according to (4), wherein the second terminal is the secondary terminal, and wherein the second base station is the primary base station.

(14)

The communication control device according to any one of (1) to (12), wherein the primary terminal and the primary base station operate according to a frequency division duplex scheme, wherein the secondary terminal and the secondary base station secondarily use an uplink channel of the primary base station, and wherein, when interference power in the primary base station caused by transmission power of the secondary terminal does not satisfy allowable interference power on an assumption that the secondary terminal is located at a cell edge of the secondary base station, the interference control unit determines that the adverse interference is present.

(15)

The communication control device according to any one of (1) to (14), wherein maximum transmission power of the secondary terminal is set to be greater as transmission power of a reference signal of the secondary base station increases.

(16)

The communication control device according to any one of (1) to (15), wherein the primary terminal and the primary base station operate according to a frequency division duplex scheme, and wherein the secondary terminal and the secondary base station operate according to a time division duplex scheme, using an aggregated channel formed by aggregating one or more component carriers on an uplink channel of the primary base station and one or more component carriers on a downlink channel of the primary base station.

(17)

The communication control device according to (16), wherein the quality report of the secondary terminal contains the communication quality indicator of each component carrier of the aggregated channel, and wherein the secondary base station uses the communication quality indicator of each component carrier to select a component carrier for transmitting resource allocation information to the secondary terminal.

(18)

A communication control method executed by a communication control device in a radio communication system including a primary base station to which a primary terminal is connected, and a secondary base station to which a secondary terminal is connected by secondarily using a frequency channel for the primary base station, the communication control method including:

obtaining at least one of a quality report containing a communication quality indicator measured by the primary terminal and a quality report containing a communication quality indicator measured by the secondary terminal;

determining whether or not adverse interference is present in the radio communication system, based on the communication quality indicator contained in the obtained quality report; and instructing the secondary base station to reduce transmission power, if determining that the adverse interference is present.

(19) A radio communication system including:
a primary base station to which a primary terminal is connected;
a secondary base station to which a secondary terminal is connected by secondarily using a frequency channel for the primary base station; and
a cooperation manager configured to instruct the secondary base station to reduce transmission power, if it is determined that adverse interference is present in the system, based on a communication quality indicator contained in at least one of a quality report containing the communication quality indicator measured by the primary terminal and a quality report containing the communication quality indicator measured by the secondary terminal.

(20) A terminal device operable in a radio communication system including a primary base station to which a primary terminal is connected, and a secondary base station to which a secondary terminal is connected by secondarily using a frequency channel for the primary base station, the terminal device including:
a control unit configured to generate a quality report containing a communication quality indicator used by a control node configured to determine whether or not adverse interference is present in the radio communication system, the communication quality indicator being used for the determination; and
a radio communication unit configured to transmit the quality report generated by the control unit to a base station to which the terminal device is connected.

REFERENCE SIGNS LIST 1 radio communication system
10 primary base station
20, 90 primary terminal
30 secondary base station
40, 90 secondary terminal
91 radio communication unit
95 control unit
100 cooperation manager (communication control device)
132 data obtaining unit
134 interference control unit

The invention claimed is:
1. A communication control device, comprising:
one or more processors configured to:
obtain, in a radio communication system including a primary base station with which a primary terminal is in communication via a primary channel, and a secondary base station with which a secondary terminal is in communication via a secondary channel, at least one of a first quality report containing a first communication quality indicator measured by the primary terminal or a second quality report containing a second communication quality indicator measured by the secondary terminal,
wherein the primary terminal and the primary base station operate based on a frequency division duplex scheme and the secondary terminal and the secondary base station operate based on a time division duplex scheme, and
wherein the secondary terminal and the secondary base station utilize an uplink frequency channel of the primary channel;
determine presence of adverse interference in the radio communication system, based on:
a first interference power in the secondary base station, that dissatisfies an allowable interference power; and
an assumption that the primary terminal is at a cell edge of the secondary base station,
wherein the first interference power is based on at least one of the first communication quality indicator or the second communication quality indicator, and
wherein the first interference power is caused by a first transmission power of the primary terminal; and
instruct the secondary base station to reduce a second transmission power of the secondary base station, based on the presence of adverse interference in the radio communication system,
wherein the first communication quality indicator is based on measurement of quality of a first signal that is one of transmitted by the primary base station or transmitted via the primary base station, and
wherein the second communication quality indicator is based on measurement of quality of a second signal that is one of transmitted by the secondary base station or transmitted via the secondary base station.

2. A communication control method, comprising:
in a communication control device:
obtaining, in a radio communication system including a primary base station with which a primary terminal is in communication via a primary channel, and a secondary base station with which a secondary terminal is in communication via a secondary channel, at least one of a first quality report containing a first communication quality indicator measured by the primary terminal or a second quality report containing a second communication quality indicator measured by the secondary terminal,
wherein the primary terminal and the primary base station operate based on a frequency division duplex scheme and the secondary terminal and the secondary base station operate based on a time division duplex scheme, and
wherein the secondary terminal and the secondary base station utilize an uplink frequency channel of the primary channel;
determining presence of adverse interference in the radio communication system, based on:
a first interference power in the secondary base station, that dissatisfies an allowable interference power; and
an assumption that the primary terminal is at a cell edge of the secondary base station,
wherein the first interference power is based on at least one of the first communication quality indicator or the second communication quality indicator, and
wherein the first interference power is caused by a first transmission power of the primary terminal; and
instructing the secondary base station to reduce a second transmission power of the secondary base station, based on the presence of the adverse interference in the radio communication system,
wherein the first communication quality indicator is based on measurement of quality of a first signal that is one of transmitted by the primary base station or transmitted via the primary base station, and
wherein the second communication quality indicator is based on measurement of quality of a second signal that is one of transmitted by the secondary base station or transmitted via the secondary base station.

3. A communication control device, comprising:
one or more processors configured to:
obtain, in a radio communication system including a primary base station with which a primary terminal is in communication via a primary channel, and a secondary base station with which a secondary terminal is in communication via a secondary channel, at least one of a first quality report containing a first communication quality indicator measured by the primary terminal or a second quality report containing a second communication quality indicator measured by the secondary terminal,
   wherein the primary terminal and the primary base station operate based on a frequency division duplex scheme and the secondary terminal and the secondary base station operate based on a time division duplex scheme, and
   wherein the secondary terminal and the secondary base station utilize an uplink frequency channel of the primary channel;
determine presence of adverse interference in the radio communication system, based on:
   a first interference power in the primary base station, that dissatisfies an allowable interference power; and
   an assumption that the secondary terminal is at a cell edge of the secondary base station,
   wherein the first interference power is based on at least one of the first communication quality indicator or the second communication quality indicator, and
   wherein the first interference power is caused by a first transmission power of the secondary terminal; and
instruct the secondary base station to reduce a second transmission power of the secondary base station, based on the presence of adverse interference in the radio communication system,
wherein the first communication quality indicator is based on measurement of quality of a first signal that is one of transmitted by the primary base station or transmitted via the primary base station, and
wherein the second communication quality indicator is based on measurement of quality of a second signal that is one of transmitted by the secondary base station or transmitted via the secondary base station.

4. A communication control method, comprising:
in a communication control device:
obtaining, in a radio communication system including a primary base station with which a primary terminal is in communication via a primary channel, and a secondary base station with which a secondary terminal is in communication via a secondary channel, at least one of a first quality report containing a first communication quality indicator measured by the primary terminal or a second quality report containing a second communication quality indicator measured by the secondary terminal,
   wherein the primary terminal and the primary base station operate based on a frequency division duplex scheme and the secondary terminal and the secondary base station operate based on a time division duplex scheme, and
   wherein the secondary terminal and the secondary base station utilize an uplink frequency channel of the primary channel;
determining presence of adverse interference in the radio communication system, based on:
   a first interference power in the primary base station, that dissatisfies an allowable interference power; and
   an assumption that the secondary terminal is at a cell edge of the secondary base station,
   wherein the first interference power is based on at least one of the first communication quality indicator or the second communication quality indicator, and
   wherein the first interference power is caused by a first transmission power of the secondary terminal; and
instructing the secondary base station to reduce a second transmission power of the secondary base station, based on the presence of the adverse interference in the radio communication system,
wherein the first communication quality indicator is based on measurement of quality of a first signal that is one of transmitted by the primary base station or transmitted via the primary base station, and
wherein the second communication quality indicator is based on measurement of quality of a second signal that is one of transmitted by the secondary base station or transmitted via the secondary base station.

* * * * *